United States Patent
Tseng et al.

(10) Patent No.: US 12,518,440 B2
(45) Date of Patent: Jan. 6, 2026

(54) NEURAL PHOTOFINISHER DIGITAL CONTENT STYLIZATION

(71) Applicant: Adobe Inc., San Jose, CA (US)

(72) Inventors: Ethan Tseng, Princeton, NJ (US); Zhihao Xia, Sunnyvale, CA (US); Yifei Fan, Santa Clara, CA (US); Xuaner Zhang, Union City, CA (US); Peter Merrill, Sunnyvale, CA (US); Lars Jebe, Erkrath (DE); Jiawen Chen, San Ramon, CA (US)

(73) Assignee: Adobe Inc., San Jose, CA (US)

( * ) Notice: Subject to any disclaimer, the term of this patent is extended or adjusted under 35 U.S.C. 154(b) by 354 days.

(21) Appl. No.: 18/067,878

(22) Filed: Dec. 19, 2022

(65) Prior Publication Data

US 2024/0202989 A1 Jun. 20, 2024

(51) Int. Cl.
*G06T 11/00* (2006.01)
*G06T 11/60* (2006.01)
(Continued)

(52) U.S. Cl.
CPC .......... *G06T 11/001* (2013.01); *G06T 11/60* (2013.01); *G06V 10/7715* (2022.01);
(Continued)

(58) Field of Classification Search
CPC ....... G06T 11/001; G06T 11/60; G06V 10/82; G06V 10/774; G06V 10/7715; G06V 20/46; G06V 2201/10
See application file for complete search history.

(56) References Cited

U.S. PATENT DOCUMENTS

2005/0047684 A1* 3/2005 Baum ................. H04N 1/6086
 382/311
2018/0268595 A1* 9/2018 Sarna ..................... G06T 13/80
(Continued)

OTHER PUBLICATIONS

"About Apple ProRAW", Apple Inc. [retrieved Oct. 5, 2022]. Retrieved from the Internet <https://support.apple.com/en-us/HT211965>., Sep. 28, 2022, 3 Pages.
(Continued)

*Primary Examiner* — Michelle Chin
(74) *Attorney, Agent, or Firm* — FIG. 1 Patents

(57) ABSTRACT

Digital content stylization techniques are described that leverage a neural photofinisher to generate stylized digital images. In one example, the neural photofinisher is implemented as part of a stylization system to train a neural network to perform digital image style transfer operations using reference digital content as training data. The training includes calculating a style loss term that identifies a particular visual style of the reference digital content. Once trained, the stylization system receives a digital image and generates a feature map of a scene depicted by the digital image. Based on the feature map as well as the style loss, the stylization system determines visual parameter values to apply to the digital image to incorporate a visual appearance of the particular visual style. The stylization system generates the stylized digital image by applying the visual parameter values to the digital image automatically and without user intervention.

20 Claims, 13 Drawing Sheets
(6 of 13 Drawing Sheet(s) Filed in Color)

(51) Int. Cl.
G06V 10/77 (2022.01)
G06V 10/774 (2022.01)
G06V 10/82 (2022.01)
G06V 20/40 (2022.01)
(52) U.S. Cl.
CPC ............ *G06V 10/774* (2022.01); *G06V 10/82* (2022.01); *G06V 20/46* (2022.01); *G06V 2201/10* (2022.01)

(56) References Cited

U.S. PATENT DOCUMENTS

| | | | |
|---|---|---|---|
| 2019/0244329 A1* | 8/2019 | Li | G06N 3/088 |
| 2021/0110588 A1* | 4/2021 | Adamson, III | G06T 11/60 |
| 2021/0279593 A1* | 9/2021 | Li | G06N 3/045 |
| 2021/0358164 A1* | 11/2021 | Liu | G06N 3/088 |
| 2022/0027792 A1* | 1/2022 | Cummings | G06N 20/00 |
| 2022/0130111 A1* | 4/2022 | Martin Brualla | G06T 17/20 |
| 2023/0098994 A1* | 3/2023 | Labatie | G06N 3/08 706/25 |

OTHER PUBLICATIONS

"Adobe Camera Raw", Adobe Inc. [retrieved Oct. 5, 2022]. Retrieved from the Internet <https://helpx.adobe.com/camera-raw/using/supported-cameras.html>., 2003, 4 Pages.
"Adobe Photoshop Lightroom", Adobe Inc. [retrieved Oct. 5, 2022]. Retrieved from the Internet <https://www.adobe.com/products/photoshop-lightroom.html>., Sep. 2017, 8 Pages.
"Darktable", Darktable [retrieved Oct. 9, 2022]. Retrieved from the Internet <https://www.darktable.org/>., Apr. 2009, 3 Pages.
"Digital Negative (DNG)", Adobe Inc. [retrieved Oct. 5, 2022]. Retrieved from the Internet <https://helpx.adobe.com/camera-raw/digital-negative.html>., 8 Pages.
"ON Semiconductor Is Now", Semiconductor Components Industries, LLC, [retrieved Oct. 9, 2022]. Retrieved from the Internet <https://www.onsemi.com/pdf/datasheet/mt9p001-d.pdf>., 2019, 34 Pages.
"PicsArt", PicsArt, Inc. [retrieved Oct. 9, 2022]. Retrieved from the Internet <https://picsart.com/>., Nov. 2011, 3 Pages.
Abdal, Rameen et al., "Image2StyleGAN: How to Embed Images Into the StyleGAN Latent Space?", 2019 IEEE/CVF International Conference on Computer Vision (ICCV) [retrieved Feb. 20, 2023]. Retrieved from the Internet <https://arxiv.org/pdf/1904.03189.pdf>., Sep. 3, 2019, 23 pages.
Abdelhamed, Abdelrahman et al., "A High-Quality Denoising Dataset for Smartphone Cameras", IEEE/CVF Conference on Computer Vision and Pattern Recognition [retrieved Oct. 5, 2022]. Retrieved from the Internet <https://abdokamel.github.io/files/SIDD_CVPR_2018.pdf>., Jun. 2018, 9 Pages.
Afifi, Mahmoud et al., "Color Temperature Tuning: Allowing Accurate Post-Capture White-Balance Editing", School of Computer and Communication Sciences [retrieved Oct. 5, 2022]. Retrieved from the Internet <https://cvil.eecs.yorku.ca/projects/public_html/ColorTemperatureTuning/files/ColorTemperatureTuning.pdf>., 2019, 6 Pages.
Afifi, Mahmoud et al., "Deep White-Balance Editing", Cornell University arXiv, arXiv.org [retrieved Oct. 5, 2022]. Retrieved from the Internet <https://arxiv.org/pdf/2004.01354.pdf>., Apr. 3, 2020, 10 Pages.
Afifi, Mahmoud et al., "Interactive White Balancing for Camera-Rendered Images", Cornell University arXiv, arXiv.org [retrieved Oct. 5, 2022]. Retrieved from the Internet <https://arxiv.org/pdf/2009.12632.pdf>., Sep. 26, 2020, 6 Pages.
Afifi, Mahmoud et al., "Learning Multi-Scale Photo Exposure Correction", Cornell University arXiv, arXiv.org [retrieved Oct. 5, 2022]. Retrieved from the Internet <https://arxiv.org/pdf/2003.11596.pdf>., Mar. 30, 2021, 23 Pages.
Afifi, Mahmoud , "Semi-Supervised Raw-to-Raw Mapping", Cornell University arXiv, arXiv.org [retrieved Oct. 5, 2022]. Retrieved from the Internet <https://arxiv.org/pdf/2106.13883.pdf>., Sep. 6, 2021, 12 Pages.
Ahmad, Maaz Bin Safeer et al., "Automatically translating image processing libraries to halide", ACM Transactions on Graphics, vol. 38, No. 6 [retrieved Oct. 5, 2022]. Retrieved from the Internet <https://maaz139.github.io/papers/sigasia19.pdf>., Nov. 8, 2019, 13 Pages.
Bergstra, James et al., "Hyperopt: A Python Library for Optimizing the Hyperparameters of Machine Learning Algorithms", Python in Science Conference [retrieved Oct. 5, 2022]. Retrieved from the Internet <https://citeseerx.ist.psu.edu/viewdoc/download?doi=10.1.1.704.3494&rep=rep1&type=pdf>., Jan. 2013, 8 Pages.
Bergstra, James et al., "Random search for hyper-parameter optimization", The Journal of Machine Learning Research, vol. 13 [retrieved 2022-10-05]. Retrieved from the Internet <https://www.jmlr.org/papers/vol. 13/bergstra12a/bergstra12a.pdf?source=post_page----------------------------->., Feb. 1, 2012, 25 Pages.
Bonneel, Nicolas et al., "Example-Based Video Color Grading", ACM TOG (Proc. SIGGRAPH), 32(4):39:1-39:12 [retrieved Oct. 5, 2022]. Retrieved from the Internet <https://vcg.seas.harvard.edu/files/pfister/files/videostyle_lowres.pdf>., Jul. 2013, 11 pages.
Bychkovsky, et al., "Learning photographic global tonal adjustment with a database of input/output image pairs", Proceedings of the 2011 IEEE Conference on Computer Vision and Pattern Recognition [retrieved Oct. 5, 2022]. Retrieved from the Internet <https://web.archive.org/web/20170809195712id_/http://people.csail.mit.edu/vladb/photoadjust/db_imageadjust.pdf>., Jun. 2011, 8 Pages.
Chen, Chen et al., "Learning to See in the Dark", Cornell University arXiv, arXiv.org [retrieved Oct. 5, 2022]. Retrieved from the Internet <https://arxiv.org/pdf/1805.01934.pdf>., May 4, 2018, 10 Pages.
Chen, Pin-Yu et al., "ZOO: Zeroth Order Optimization based Black-box Attacks to Deep Neural Networks without Training Substitute Models", Cornell University arXiv, arXiv.org [retrieved Oct. 5, 2022]. Retrieved from the Internet <https://arxiv.org/pdf/1708.03999.pdf>., Nov. 2, 2017, 13 Pages.
Chen, Qifeng et al., "Fast Image Processing With Fully-Convolutional Networks", Cornell University arXiv, arXiv.org [retrieved Oct. 5, 2022]. Retrieved from the Internet <https://arxiv.org/pdf/1709.00643.pdf>., Sep. 2, 2017, 16 Pages.
Conde, Marcos et al., "Model-Based Image Signal Processors via Learnable Dictionaries", Cornell University arXiv, arXiv.org [retrieved Oct. 5, 2022]. Retrieved from the Internet <https://arxiv.org/pdf/2201.03210.pdf>., Jan. 10, 2022, 9 Pages.
Deng, Jia et al., "ImageNet: A Large-Scale Hierarchical Image Database", In Proceedings of IEEE Conference on Computer Vision and Pattern Recognition [retrieved Nov. 16, 2022]. Retrieved from the Internet <https://www-cs-faculty.stanford.edu/groups/vision/documents/ImageNet_CVPR2009.pdf>., Jun. 20, 2009, 8 pages.
Diamond, Steven et al., "Dirty Pixels: Towards End-to-End Image Processing and Perception", Cornell University arXiv, arXiv.org [retrieved Oct. 5, 2022]. Retrieved from the Internet <https://arxiv.org/pdf/1701.06487.pdf>., May 8, 2021, 15 Pages.
Du, Zheng-Jun et al., "Video recoloring via spatial-temporal geometric palettes", ACM, vol. 40, No. 4 [retrieved Oct. 5, 2022]. Retrieved from the Internet, <https://cragl.cs.gmu.edu/videopalette/Video%20Recoloring%20via%20Spatial-Temporal%20Geometric%20Palettes%20(Zheng-Jun%20Du,%20Kai-Xiang%20Lei,%20Kun%20Xu,%20Jianchao%20Tan,%20Yotam%20Gingold%202021%20SIGGRAPH%20Asia).pdf>., Jul. 19, 2021, 16 Pages.
Dumoulin, Vincent et al., "A Learned Representation For Artistic Style", Cornell University arXiv, arXiv.org [retrieved Oct. 5, 2022]. Retrieved from the Internet <https://arxiv.org/pdf/1610.07629.pdf>., Feb. 9, 2017, 26 Pages.
Efros, Alexei A et al., "Image Quilting for Texture Synthesis and Transfer", SIGGRAPH 2001, Computer Graphics Proceedings, ACM Press/ACM SIGGRAPH [retrieved Oct. 5, 2022]. Retrieved from the Internet <https://citeseerx.ist.psu.edu/viewdoc/download?doi=10.1.1.10.9655&rep=rep1&type=pdf>., Aug. 2001, 6 pages.
Eismann, Katrin et al., "Adobe Photoshop Restoration & Retouching (4th Edition)", Internet Archive [retrieved Oct. 14, 2022]. Retrieved from the Internet <https://archive.org/details/adobe-photoshop-restoration-and-retouching>., Aug. 2018, 1016 Pages.

(56) References Cited

OTHER PUBLICATIONS

Gatys, Leon A. et al., "Image Style Transfer Using Convolutional Neural Networks", In Proc. CVPR, 2016. [retrieved Feb. 19, 2022]. Retrieved from the Internet <https://rn-unison.github.io/articulos/style_transfer.pdf>., Jun. 2016, 10 Pages.

Gharbi, Michaël, "Deep Bilateral Learning for Real-Time Image Enhancement", Cornell University arXiv, arXiv.org [retrieved Oct. 5, 2022]. Retrieved from the Internet <https://arxiv.org/pdf/1707.02880.pdf>., Aug. 22, 2017, 12 Pages.

Gharbi, Michaël et al., "Deep joint demosaicking and denoising", ACM Transactions on Graphics, vol. 35, No. 6 [retrieved Oct. 5, 2022]. Retrieved from the Internet <https://dspace.mit.edu/handle/1721.1/134672>., Dec. 5, 2016, 13 Pages.

Hansen, Nikolaus, "The CMA Evolution Strategy: A Comparing Review", CoLab Computational Laboratory [retrieved Oct. 5, 2022]. Retrieved from the Internet <http://www.cmap.polytechnique.fr/~nikolaus.hansen/hansenedacomparing.pdf>., Jun. 2007, 28 pages.

He, Kaiming et al., "Deep Residual Learning for Image Recognition", arXiv Preprint, arXiv.org [retrieved Feb. 19, 2023]. Retrieved from the Internet <https://arxiv.org/pdf/1512.03385.pdf>., Dec. 10, 2015, 12 pages.

Hegarty, James et al., "Darkroom: compiling high-level image processing code into hardware pipelines", ACM Transactions on Graphics, vol. 33, No. 4 [retrieved Oct. 5, 2022]. Retrieved from the Internet <https://citeseerx.ist.psu.edu/viewdoc/download?doi=10.1.1.648.4227&rep=rep1&type=pdf>., Jul. 27, 2014, 11 Pages.

Heide, Felix et al., "FlexISP: a flexible camera image processing framework", ACM Transactions on Graphics [retrieved Oct. 5, 2022]. Retrieved from the Internet <https://repository.kaust.edu.sa/handle/10754/556541>., Nov. 19, 2014, 13 Pages.

Hertzmann, Aaron et al., "Image Analogies", Proceedings of SIGGRAPH 2001 [retrieved Oct. 5, 2022]. Retrieved from the Internet <https://legacy.sites.fas.harvard.edu/~cs278/papers/analogies.pdf>., Aug. 2001, 14 pages.

Howard, Andrew G et al., "MobileNets: Efficient Convolutional Neural Networks for Mobile Vision Applications", Cornell University, arXiv Preprint, arXiv.org [retrieved Oct. 5, 2022]. Retrieved from the Internet <https://arxiv.org/pdf/1704.04861>., Apr. 2017, 9 Pages.

Hu, Yuanming et al., "Exposure: A White-Box Photo Post-Processing Framework", ACM Transactions on Graphics, vol. 37, No. 2 [retrieved Oct. 5, 2022]. Retrieved from the Internet <https://web.archive.org/web/20200322160403id_/https://www.microsoft.com/en-us/research/uploads/prod/2018/01/Exposure.pdf>., Feb. 6, 2018, 23 pages.

Ignatov, Andrey et al., "Replacing Mobile Camera ISP with a Single Deep Learning Model", Cornell University arXiv, arXiv.org [retrieved Oct. 5, 2022]. Retrieved from the Internet <https://arxiv.org/pdf/2002.05509.pdf>., Feb. 13, 2020, 11 Pages.

Isola, Phillip et al., "Image-to-Image Translation with Conditional Adversarial Networks", 2017 IEEE Conference on Computer Vision and Pattern Recognition (CVPR) [retrieved Feb. 19, 2023]. Retrieved from the Internet <https://gangw.web.illinois.edu/class/cs598/papers/CVPR17-img2img.pdf>., Nov. 22, 2017, 17 pages.

Johnson, Justin et al., "Perceptual Losses for Real-Time Style Transfer and Super-Resolution.", Cornell University arXiv, arXiv.org [retrieved Nov. 20, 2022]. Retrieved from the Internet <https://arxiv.org/pdf/1603.08155.pdf>., Mar. 27, 2016, 18 pages.

Karaimer, Hakki Can, "A Software Platform for Manipulating the Camera Imaging Pipeline", ECCV [retrieved Oct. 5, 2022]. Retrieved from the Internet <http://www.cse.yorku.ca/~mbrown/pdf/Karaimer_Brown_ECCV16.pdf>., Jul. 2016, 16 Pages.

Karras, Tero et al., "A Style-Based Generator Architecture for Generative Adversarial Networks", Cornell University arXiv, arXiv.org [retrieved Feb. 20, 2023]. Retrieved from the Internet <https://arxiv.org/pdf/1812.04948.pdf>., Mar. 29, 2019, 12 pages.

Kingma, Diederik P. et al., "Adam: A Method for Stochastic Optimization", Cornell University, arXiv Preprint, arXiv.org [retrieved Feb. 20, 2023]. Retrieved from the Internet <https://arxiv.org/pdf/1412.6980.pdf>., Jan. 30, 2017, 15 pages.

Li, Tzu-Mao et al., "Differentiable programming for image processing and deep learning in halide", ACM Transactions on Graphics [retrieved Nov. 30, 2022]. Retrieved from the Internet <https://dspace.mit.edu/handle/1721.1/122623>., Aug. 2018, 14 Pages.

Liu, Yu-Lun, "Single-Image HDR Reconstruction by Learning to Reverse the Camera Pipeline", Cornell University arXiv, arXiv.org [retrieved Oct. 5, 2022]. Retrieved from the Internet <https://arxiv.org/pdf/2004.01179.pdf>., Apr. 2, 2020, 10 Pages.

Martinez-Cantin, Ruben, "BayesOpt: A Bayesian Optimization Library for Nonlinear Optimization, Experimental Design and Bandits", Cornell University arXiv, arXiv.org [retrieved Oct. 5, 2022]. Retrieved from the Internet <https://arxiv.org/pdf/1405.7430.pdf>., May 29, 2014, 5 Pages.

McKay, M. D. et al., "A Comparison of Three Methods for Selecting Values of Input Variables in the Analysis of Output From a Computer Code", Technometrics vol. 42, No. 1 [retrieved Oct. 5, 2022]. Retrieved from the Internet <https://www.stat.cmu.edu/technometrics/90-00/vol-42-01/v4201055.pdf>., Mar. 12, 2012, 7 Pages.

Mildenhall, Ben et al., "NeRF in the Dark: High Dynamic Range View Synthesis from Noisy Raw Images", Cornell University arXiv, arXiv.org [retrieved Oct. 5, 2022]. Retrieved from the Internet <https://arxiv.org/pdf/2111.13679.pdf>., Nov. 26, 2021, 18 Pages.

Mosleh, Ali et al., "Hardware-in-the-Loop End-to-End Optimization of Camera Image Processing Pipelines", Conference on Computer Vision and Pattern Recognition [retrieved Oct. 9, 2022]. Retrieved from the Internet <10.1109/CVPR42600.2020.00755>., 2020, 10 Pages.

Nishimura, Jun, "Automatic ISP image quality tuning using nonlinear optimization", Cornell University arXiv, arXiv.org [retrieved Oct. 9, 2022]. Retrieved from the Internet <https://arxiv.org/ftp/arxiv/papers/1902/1902.09023.pdf>., Feb. 2019, 5 Pages.

Onzon, Emmanuel et al., "Neural Auto-Exposure for High-Dynamic Range Object Detection", Conference on Computer Vision and Pattern Recognition [retrieved Oct. 9, 2022]. Retrieved from the Internet <10.1109/CVPR46437.2021.00762>., Jun. 2021, 11 Pages.

Ramanath, R. et al., "Color image processing pipeline", IEEE Signal Processing Magazine vol. 22, No. 1 [retrieved Oct. 9, 2022]. Retrieved from the Internet <https://www2.cs.sfu.ca/~mark/ftp/SignalProcessing05/Color_image_processing_pipeline05.pdf>., Jan. 2005, 10 Pages.

Shao, Ling et al., "From Heuristic Optimization to Dictionary Learning: A Review and Comprehensive Comparison of Image Denoising Algorithms", IEEE Transactions on Cybernetics vol. 44, No. 7 [retrieved Oct. 12, 2022]. Retrieved from the Internet <https://ieeexplore.ieee.org/document/6587769>., Aug. 2013, 13 Pages.

Shi, Zheng et al., "ZeroScatter: Domain Transfer for Long Distance Imaging and Vision through Scattering Media", Cornell University arXiv, arXiv.org [retrieved Oct. 9, 2022]. Retrieved from the Internet <https://arxiv.org/pdf/2102.05847.pdf>., Mar. 30, 2021, 11 Pages.

Szegedy, Christian et al., "Rethinking the Inception Architecture for Computer Vision", Cornell University arXiv, arXiv.org [retrieved Oct. 9, 2022]. Retrieved from the Internet <https://arxiv.org/pdf/1512.00567.pdf>., Dec. 11, 2015, 10 pages.

Tseng, Ethan et al., "Hyperparameter optimization in black-box image processing using differentiable proxies", ACM Transactions on Graphics [retrieved Oct. 9, 2022]. Retrieved from the Internet <https://www.cs.princeton.edu/~fheide/ProxyOpt.pdf>., Jul. 2019, 14 Pages.

Wu, Bichen et al., "FBNet: Hardware-Aware Efficient ConvNet Design via Differentiable Neural Architecture Search", Cornell University arXiv, arXiv.org [retrieved Oct. 9, 2022]. Retrieved from the Internet <https://arxiv.org/pdf/1812.03443.pdf>., May 24, 2019, 10 Pages.

Xia, Xide et al., "Joint Bilateral Learning for Real-time Universal Photorealistic Style Transfer", Cornell University arXiv, arXiv.org [retrieved Oct. 9, 2022]. Retrieved from the Internet <https://arxiv.org/pdf/2004.10955.pdf>., Apr. 27, 2020, 16 Pages.

Yoo, Jaejun et al., "Photorealistic Style Transfer via Wavelet Transforms", Cornell University arXiv, arXiv.org [retrieved Oct. 9, 2022]. Retrieved from the Internet <https://arxiv.org/pdf/1903.09760.pdf>., Sep. 29, 2019, 17 Pages.

Yu, Ke et al., "ReconfigISP: Reconfigurable Camera Image Processing Pipeline", Cornell University arXiv, arXiv.org [retrieved

(56) References Cited

OTHER PUBLICATIONS

Oct. 9, 2022]. Retrieved from the Internet <https://arxiv.org/pdf/2109.04760.pdf>., Sep. 10, 2021, 10 Pages.

Zhang, Lei et al., "Color demosaicking by local directional interpolation and nonlocal adaptive thresholding", Journal of Electronic Imaging [retrieved Oct. 9, 2022]. Retrieved from the Internet <https://asset-pdf.scinapse.io/prod/1912194039/1912194039.pdf>., Apr. 2011, 18 Pages.

Zhang, Richard et al., "The Unreasonable Effectiveness of Deep Features as a Perceptual Metric", Cornell University arXiv, arXiv.org [retrieved Mar. 9, 2023]. Retrieved from the Internet <https://arxiv.org/pdf/1801.03924.pdf>., Apr. 10, 2018, 14 Pages.

Zhou, Dongzhan et al., "EcoNAS: Finding Proxies for Economical Neural Architecture Search", Cornell University arXiv, arXiv.org [retrieved Oct. 9, 2022]. Retrieved from the Internet <https://arxiv.org/pdf/2001.01233.pdf>., Feb. 27, 2020, 12 Pages.

Zhou, Hongpeng et al., "BayesNAS: A Bayesian Approach for Neural Architecture Search", Cornell University arXiv, arXiv.org [retrieved Oct. 9, 2022]. Retrieved from the Internet <https://arxiv.org/pdf/1905.04919.pdf>., Jun. 7, 2019, 25 Pages.

Zhu, Jun-Yan et al., "Unpaired Image-to-Image Translation using Cycle-Consistent Adversarial Networks", 2017 IEEE International Conference on Computer Vision (ICCV) [retrieved Oct. 9, 2022]. Retrieved from the Internet <https://eva.fing.edu.uy/pluginfile.php/320560/mod_resource/content/1/Zhu_Unpaired_Image-To-Image_Translation_ICCV_2017_paper.pdf>., Nov. 15, 2018, 10 pages.

\* cited by examiner

NEURAL PHOTOFINISHER DIGITAL CONTENT STYLIZATION

BACKGROUND

Image processing techniques are employed by computing devices to impart visual effects to raw image inputs. Comparable to how a darkroom is used to develop photographic film, image processing software is used by photofinishing pipelines to render digital photographs by converting camera sensor measurements into recognizable images. To do so, conventional photofinishing pipelines involve a user interactively adjusting "slider values" that control visual attributes (e.g., exposure, contrast, temperature, etc.) until the user is satisfied with the result. These methods enable a high degree of user control, however, are time consuming and limited by the expertise of the user. Automatic tuning approaches exist, such as options to apply preset slider values or a "filter" to a digital image, however these "one-size-fits all" approaches negate fine-tuned user control and limit creative capabilities.

SUMMARY

Techniques for digital content stylization are described that leverage a differentiable neural photofinisher to generate stylized digital images. The neural photofinisher includes a plurality of neural proxies that are individually trained to perform image processing transformations independent of other neural proxies. The neural photofinisher facilitates training for a variety of applications. In an example, the neural photofinisher is implemented as part of a stylization system to generate a stylized digital image from a raw image input based on reference digital content with a particular visual style.

The stylization system leverages the neural photofinisher to train a neural network to perform digital image style transfer operations using the reference digital content as training data. The training includes calculating a style loss term that identifies features of the particular visual style. Once trained, the stylization system receives input data including a digital image and generates a feature map of a scene depicted by the digital image. Based on the feature map as well as the style loss, the stylization system determines visual parameter values to apply to the digital image to incorporate a visual appearance of the particular visual style. The stylization system then generates the stylized digital image by applying the visual parameter values to the digital image automatically and without user intervention. In this way, the techniques described herein enable generation of a stylized digital image that is based on visual features of the digital image as well as learned visual attributes of the reference digital content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
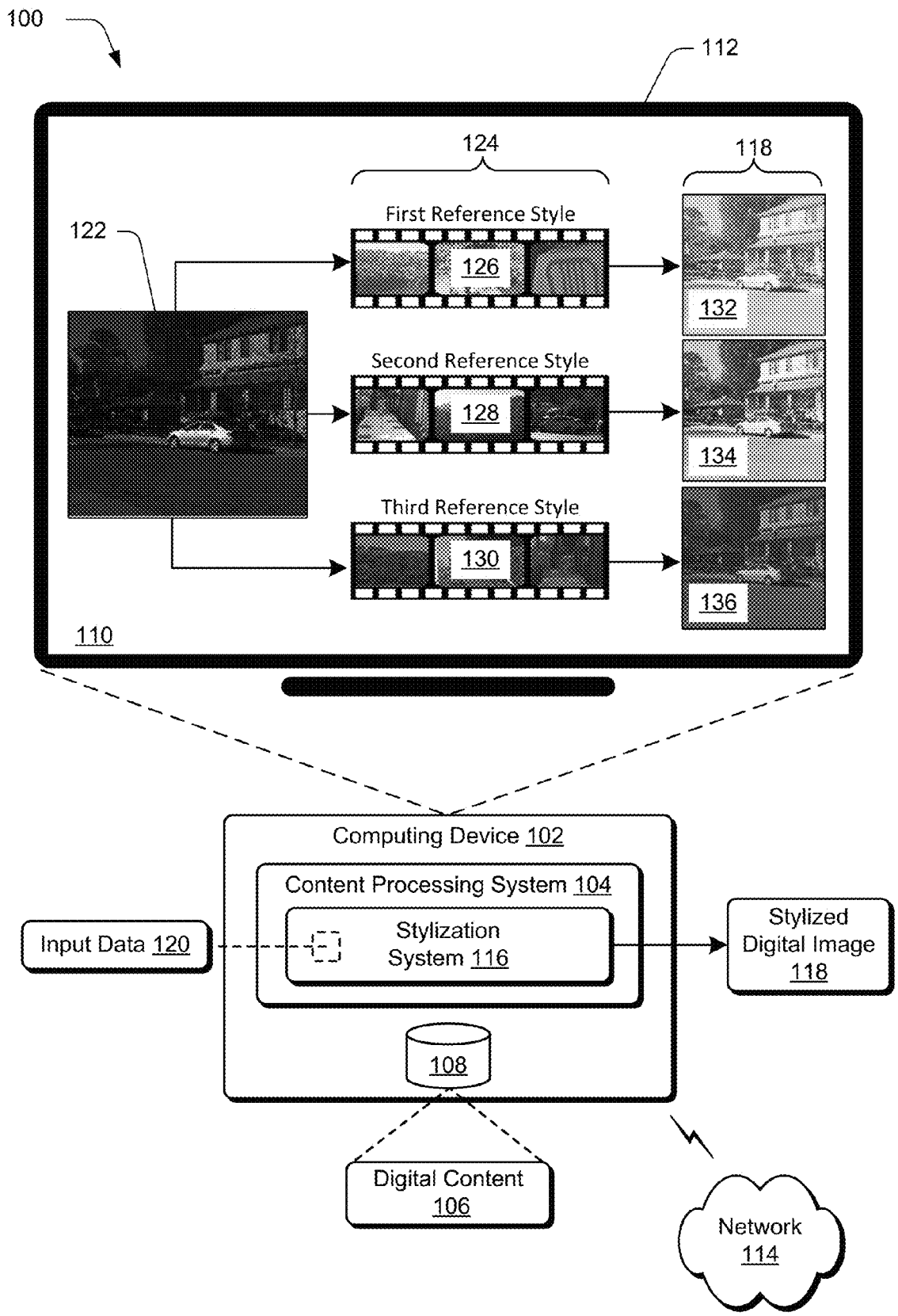
FIG. 1 is an illustration of an environment in an example implementation that is operable to employ neural photofinisher digital content stylization techniques described herein.

Conventional image processing techniques such as photofinishing pipelines include a series of processing "blocks" to sequentially apply algorithm-based transformations to an input image. Each processing block corresponds to a transformation to modify a particular visual attribute of the input image. To implement the transformations, these conventional techniques involve a user interactively controlling "slider values" to adjust the visual attributes of the input image to generate an output image. However, due to the sequential topology of such conventional pipelines, transformations applied early in the pipeline can cause significant downstream changes.

Further, these pipelines are nondifferentiable, such that mathematical determinations of how changes to an input image and/or slider values affect the output image are not obtainable. Accordingly, a user relying on conventional techniques is forced to "guess and check" as to slider values that result in a visually appealing output which is time consuming and uninformative for future image processing actions. Additionally, the lack of insight from nondifferentiable pipelines inhibits machine learning applications. Some conventional techniques include automatic slider setting tools such as "auto-adjust" features, however these "one-size-fits all" techniques negate fine-tuned user control and further do not consider features of an input image.

Machine learning approaches have been developed for image processing tasks. One conventional machine learning approach utilizes a generative adversarial network to enable editing by modifying a latent code. However, these techniques entangle visual attributes and thus fail to provide intuitive control over editing. Other conventional machine learning techniques approximate reference photofinishing pipelines "end-to-end," for instance based on input images and corresponding output images by the reference photofinishing pipelines. These monolithic techniques do not provide consideration for intermediate transformations, and instead attempt to model the pipeline "as a whole." Accordingly, these conventional techniques involve a substantial amount of training data and further fail to accurately model complex transformations present in reference photofinishing pipelines. Thus, conventional machine learning approaches are computationally expensive to train and fail to accurately approximate reference photofinishing pipelines.

Accordingly, digital content stylization techniques are described that incorporate a differentiable neural photofinisher to generate stylized digital images. Rather than monolithic models that are used in conventional machine learning techniques, the neural photofinisher concatenates a plurality of neural proxies that are individually trained to perform image processing transformations directly to input data independent of other neural proxies. For instance, each neural proxy is a neural network that models a processing block of a reference photofinishing pipeline and are trained on intermediate images "tapped out" of the reference photofinishing pipeline. In this way, the differentiable neural photofinisher provides accurate photofinishing capabilities while disentangling visual attributes from one another to provide semantic meaning to image transformations. Further, by including multiple neural proxies to represent different image transformations, the neural photofinisher supports backpropagation of various gradients to facilitate training for diverse applications and/or implementations.

For instance, the neural photofinisher is implemented as part of a stylization system to generate a stylized digital image from an input digital image, e.g., a raw image file, based on reference digital content. The reference digital content includes a plurality of digital images with a particular visual "style" such that each digital image in the reference digital content has a common "look and feel" independent of scenes depicted by the digital images. Consider, for instance, an example in which a content creator wishes to impart a particular visual style from her favorite movie to a digital image that she has captured. Accordingly, frames from the movie with a consistent style are used as reference digital content. The stylization system trains a neural network that includes an encoder as well as the neural photofinisher to perform digital image style transfer operations using the reference digital content as training data, which in this example includes the frames from the movie.

Training in this example is multifaceted and involves teaching the neural network "what" the particular style embodied by the reference digital content includes as well as teaching the network how to apply the particular style to diverse input digital images. For instance, the stylization system trains the encoder of the neural network to generate feature maps that identify local and global features of input digital images. In some examples, the feature maps are augmented with image statistics that are extracted from the input digital images. Accordingly, the stylization system accounts for variations between different input digital images that include different features, depict different scenes, etc. This functionality is not possible using conventional techniques which fail to consider features of input images in stylization operations.

The stylization system is further operable to calculate a style loss as part of teaching the neural network the particular style embodied by the reference digital content, e.g., the frames of the movie. For instance, the style loss term identifies one or more of a perceptual brightness of the particular visual style, a color palette of the particular visual style, and/or additional non-content features of the particular visual style. As part of the training, the neural photofinisher of the stylization supports backpropagation of the style loss term to the encoder. Whereas conventional "auto-adjustment" techniques employ a limited "one-size-fits all" approach, the techniques described herein support training the neural network on a variety of reference digital content and thus the stylization system is adaptable to generate stylized digital images in a variety of styles.

With the neural network trained, the stylization system receives an input digital image such as a raw digital image, e.g., the digital image that the content creator captured. The neural network generates a feature map of a scene depicted by the raw digital image that describes various global and/or local features of the scene. Based on the feature map as well as the style loss, the stylization system determines visual parameter values to apply to the raw digital image to incorporate an appearance of the particular visual style, e.g., the visual style of the movie. The parameter values, for instance, define relative amounts of visual attributes such as temperature, tint, exposure, contrast, saturation, shadows, highlights, texture, etc. to apply to the raw digital image.

The stylization system leverages the differentiable neural photofinisher to generate a stylized digital image by applying the parameter values to the raw digital image automatically and without user intervention. In this example, the stylization system applies the parameter values to the digital image captured by the content creator to impart the particular visual style of her favorite movie. Accordingly, the techniques described herein overcome the limitations of conventional techniques by generating the stylized digital image based on visual features of the input digital image as well as learned visual attributes of the reference digital content.

A variety of other applications and implementations for the neural photofinisher are also considered. In one example, the neural photofinisher is leveraged to predict visual parameter values to generate a stylized digital image that looks like it was finished by a reference photofinishing pipeline, such as a "black box" image signal processing pipeline. In an additional or alternative example, the neural photofinisher is implemented as part of a joint denoising and demosaicing network. In yet another implementation, the neural photofinisher is leveraged to investigate an adversarial attack for image classifiers. The neural photofinisher is further usable for data augmentation with increased efficiency, e.g., to generate a variety of training images for variable machine learning applications. Thus, due to its particular architecture and trainability, the neural photofinisher has varied applications and implementations. Further discussion of these and other examples and advantages are included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the neural photofinisher digital content stylization techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 13.

The computing device 102 is illustrated as including a content processing system 104. The content processing system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. Although illustrated as implemented locally at the computing device 102, functionality of the content processing system 104 is also configurable as whole or part via functionality available via the network 114, such as part of a web service or "in the cloud."

An example of functionality incorporated by the content processing system 104 to process the digital content 106 is illustrated as a stylization system 116. The stylization system 116 is representative of functionality to generate a stylized digital image 118, for instance based on a visual "style" of one or more reference images. For instance, in the illustrated example the stylization system 116 receives input data 120 including an input digital image 122 and reference digital content 124. In this example, the input digital image 122 is an unprocessed raw digital image file that depicts a scene, for instance a car in front of a house. The reference digital content 124 includes digital images of a first reference style 126, a second reference style 128, and a third reference style 130, each reference style having its own particular "look and feel". In this example, the digital images in the reference digital content 124 include frames from video clips that have been edited to have a consistent style throughout.

The stylization system 116 is operable to train a neural network to perform style transfer operations based on the reference digital content 124. The training involves calculating a style loss term based on a particular visual style of the reference digital content 124. In the illustrated example, this includes calculating a style loss term for the first reference style 126, the second reference style 128, and the third reference style 130. The stylization system 116 is also operable to determine a feature map that includes global and local features based on the scene depicted by the input digital image 122.

Based on the feature map and the style loss, the stylization system 116 determines visual parameter values to apply to the input digital image 122 to incorporate a visual appearance of a particular reference style, e.g., the first reference style 126, the second reference style 128, or the third reference style 130. The visual parameter values, for instance, represent relative amounts of visual attributes such as temperature, contrast, tint, exposure, saturation, etc. The stylization system 116 generates a stylized digital image 118 by leveraging a neural photofinisher to apply the visual parameter values to the input digital image 122.

Thus, the stylized digital image is generated automatically and without user intervention based on features of the input digital image 122 as well as learned visual attributes of the reference digital content 124. As illustrated, a first stylized image 132 depicts the scene with a visual appearance of the first reference style 126, a second stylized image 134 depicts the scene with a visual appearance of the second reference style 128, and a third stylized image 136 depicts the scene with a visual appearance of the third reference style 130. This functionality is not possible using conventional techniques which either involve tedious manual editing or apply a "one-size-fits-all approach" that do not consider reference visual styles. Further discussion of these and other advantages is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Neural Photofinisher Digital Content Stylization

Figure 10:
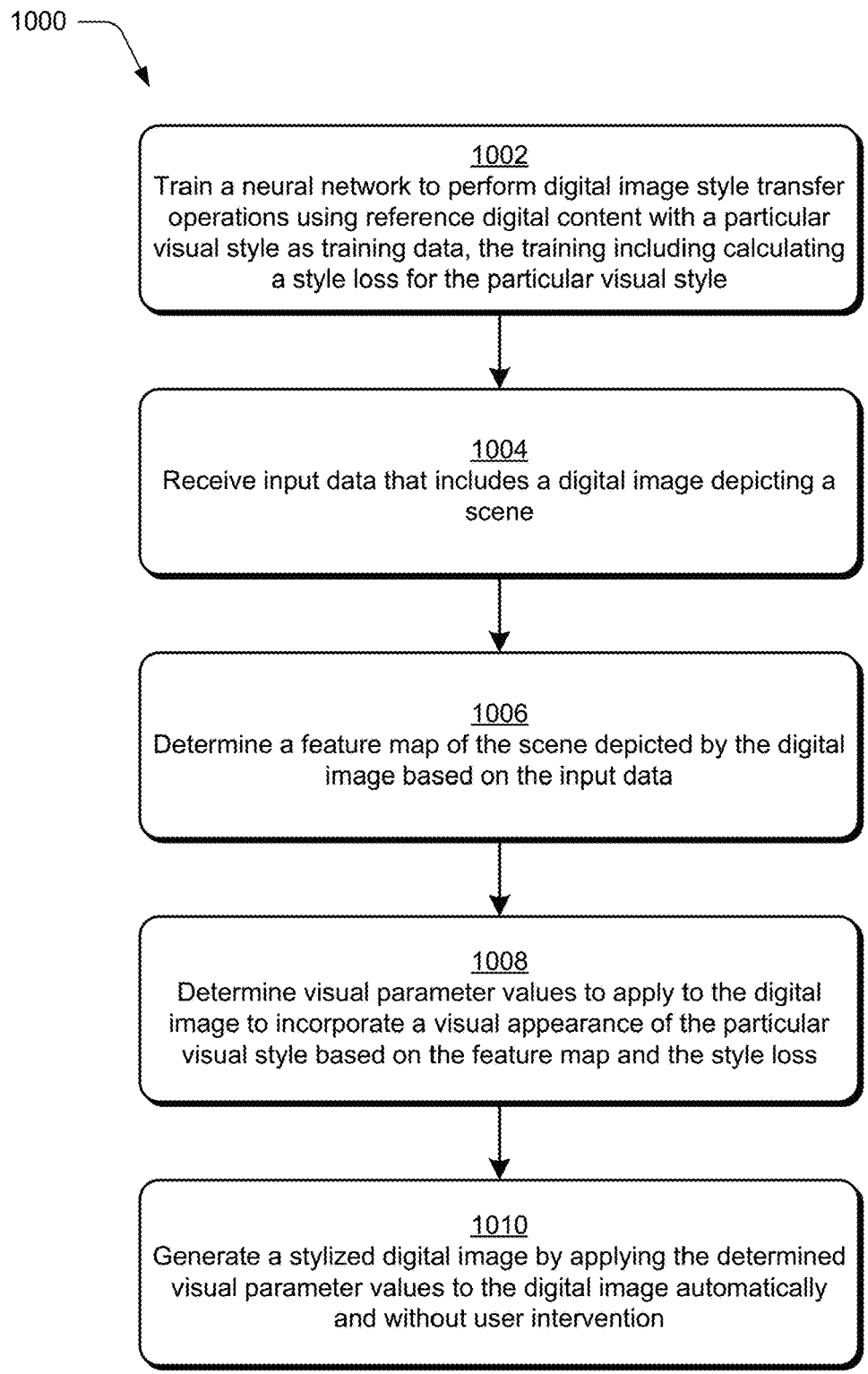
FIG. 10 is a flow diagram depicting a procedure in an example implementation of generating a stylized digital image based on reference digital content.
Figure 11:
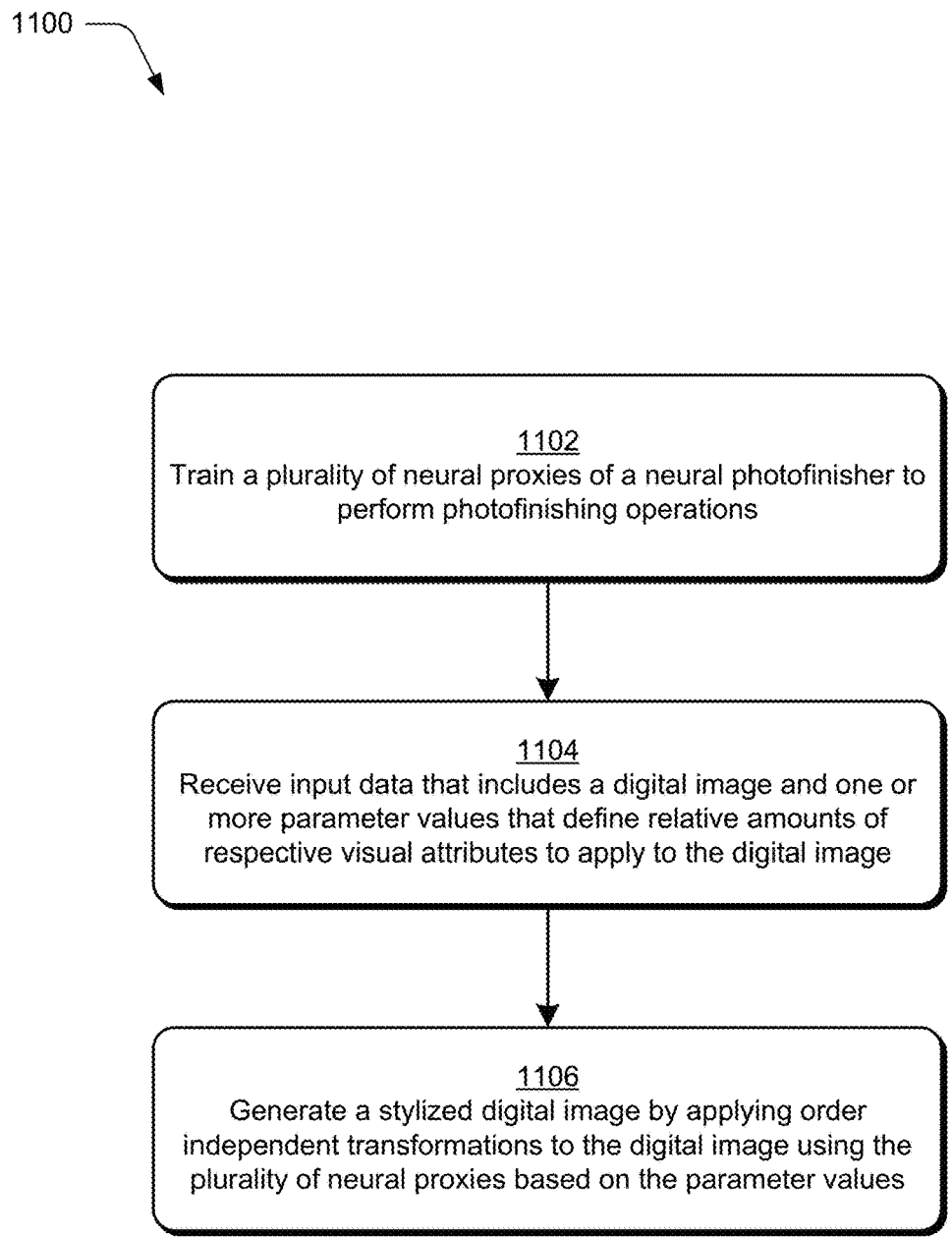
FIG. 11 is a flow diagram depicting a procedure in an example implementation of generating a stylized digital image using a neural photofinisher.
Figure 12:
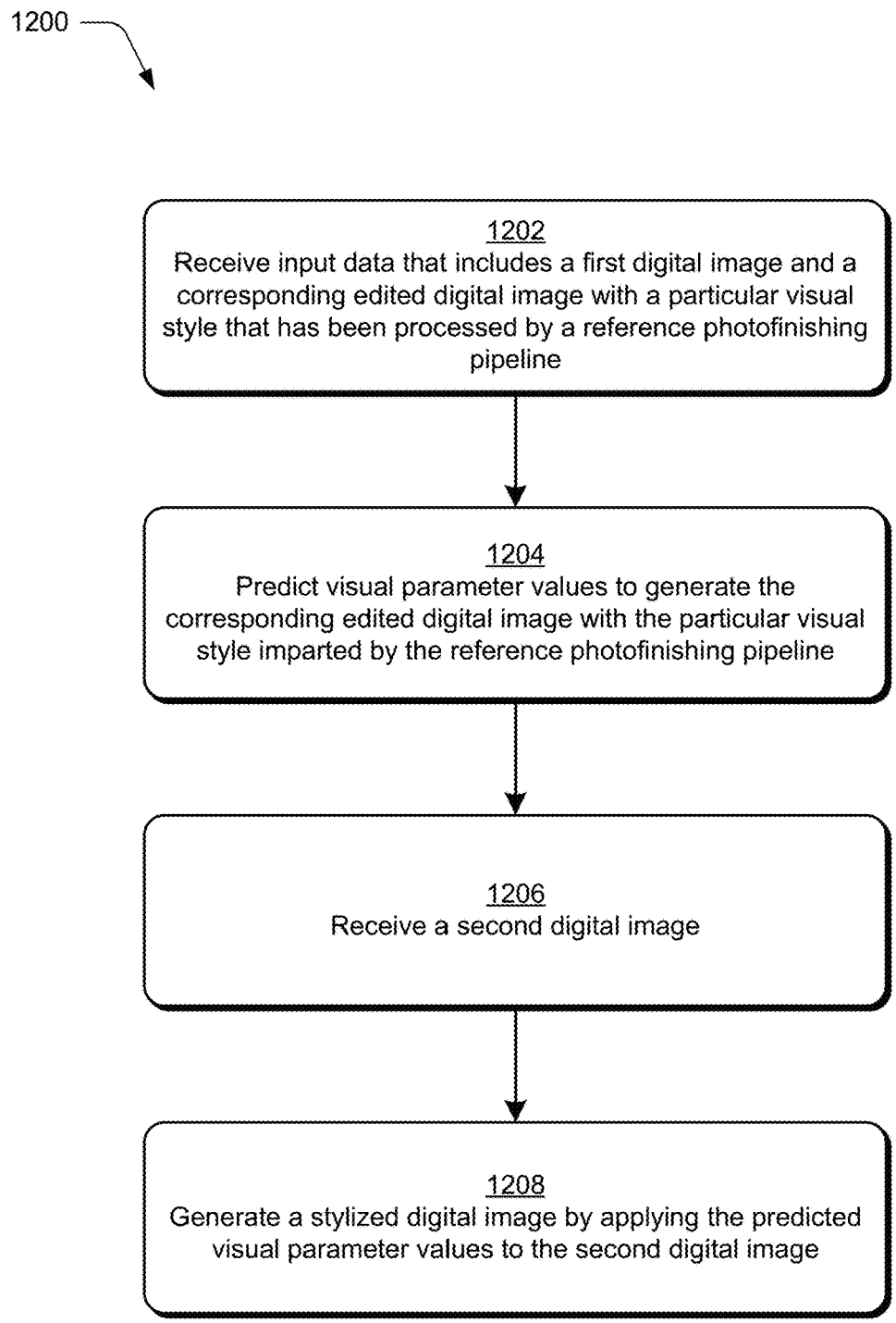
FIG. 12 is a flow diagram depicting a procedure in an example implementation of generating a stylized digital image based on a reference photofinishing pipeline.

The following discussion describes neural photofinisher digital content stylization techniques that are implementable utilizing the previously described systems and devices. Aspects of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-12 and in parallel to the procedure 1000 of FIG. 10, the procedure 1100 of FIG. 11, and the procedure 1200 of FIG. 12.

Stylization System Including a Style Transfer Neural Network

Figure 2:
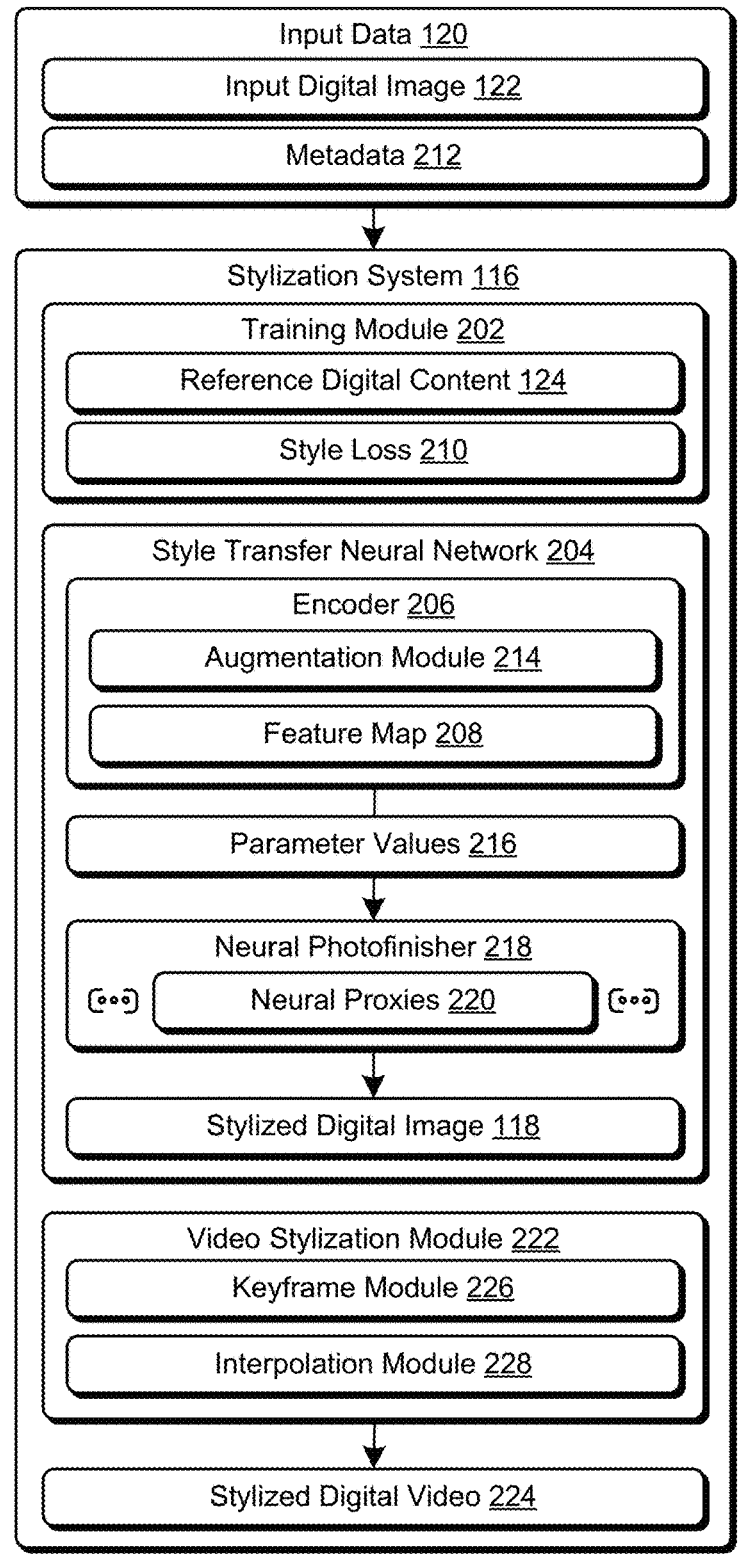
FIG. 2 depicts a system in an example implementation showing operation of a stylization system of FIG. 1 in greater detail.

FIG. 2 depicts a system 200 in an example implementation showing operation of a stylization system 116 of FIG. 1 in greater detail as automatically generating a stylized digital image 118. In this example, the stylization system 116, e.g., an automatic style transfer system, includes a training module 202 configured to train a neural network such as a style transfer neural network 204 to perform digital image style transfer operations using reference digital content 124 as training data (block 1002). The reference digital content 124 includes one or more digital images with a particular visual "style" such that each digital image in the reference digital content 124 has a common "look and feel" based on visual properties and/or attributes independent of respective scenes depicted by the images, for instance color palette, illumination, contrast, resolution, focus, etc.

In one example, images included in the reference digital content 124 include a plurality of frames from a digital video that represents the particular visual style. For instance, the frames are obtained from a pre-finished video, such as a movie and/or TV show. In this way, the stylization system 116 is implementable to generate stylized digital images 118 in the style of the pre-finished video automatically and without user intervention. This is by way of example and not limitation, and in various examples the reference digital content 124 includes images with a common style from a specific device (e.g., particular mobile device, camera model, etc.), designed by a particular content creator/editor, from a particular digital image collection, processed by a particular reference photofinishing pipeline, etc. Thus, the training module 202 is operable to train the style transfer neural network 204 to generate stylized digital images 118 in a variety of styles with a corresponding set of visual attributes. In some examples, the stylization system 116 is operable to receive an input to select one of the variety of visual styles to generate a stylized digital image 118 in the selected visual style.

The training includes teaching the style transfer neural network 204 "what" a particular style includes, as well as how the network can be "generalized" to apply the particular style to variable input images depicting different scenes and/or having different visual properties. To teach the style transfer neural network 204 how to account for variations in input images, the training module 202 conditions the style transfer neural network 204 on raw input images, such as a collection of raw image training data, to identify features of scenes depicted by the raw input images. For instance, the style transfer neural network 204 includes an encoder 206 that is trained to generate feature maps 208 that represent local and global features of the raw input images.

Features, for instance, include one or more objects depicted in scenes of the raw image training data, relation of scene objects to one another, image resolution, image clarity, pixel count, pixel values, "baseline" visual attribute values for the raw images (e.g., baseline temperature, tint, exposure, contrast, saturation, shadows, highlights, texture, etc.), regional variations in baseline visual attribute values, etc. In some examples, the training further includes teaching the encoder 206 how to augment the feature maps 208 with image statistics such as histograms extracted from the raw input images. Thus, the style transfer neural network 204 is trained to account for variations between different input digital images that include different features, depict different scenes, etc. This functionality is not possible using conventional techniques which fail to consider features of input images in stylization operations.

To teach the style transfer neural network 204 the particular visual style, the training module 202 calculates a style loss 210 for the particular visual style embodied by the reference digital content 124. In various examples, the style loss 210 includes one or more of a luma loss term $\mathcal{L}$ LUMA to identify a perceptual brightness of the particular visual style, a chroma loss term $\mathcal{L}$ CHROMA to determine a color palette of the particular visual style, and a gram loss term $\mathcal{L}$ GRAM that identifies non-content features of the particular visual style.

For instance, the style loss 210 is computed for each image included in the reference digital content 124 as: $\mathcal{L}_{STYLE}=\mathcal{L}_{GRAM}+\lambda_1\mathcal{L}_{LUMA}+\lambda_2\mathcal{L}_{CHROMA}$ with:

$$\mathcal{L}_{GRAM} = \mathcal{L}(G(I_F), G(I_S))$$
$$\mathcal{L}_{LUMA} = \mathcal{L}(H_{1d}(I_F^Y), H_{1d}(I_S^Y))$$
$$\mathcal{L}_{CHROMA} = \mathcal{L}(H_{2d}(I_F^{UV}), H_{2d}(I_S^{UV}))$$

In this example, $\lambda_1$ is a scalar weight applied to the luma loss term $\mathcal{L}_{LUMA}$ and $\lambda_2$ is a scalar weight applied to the chroma loss term $\mathcal{L}_{CHROMA}$. Additionally, $I_F=f_{REF}(I_R, E(I_R))$ is a finished photo output based on a given input raw image $I_R$, where $f_{REF}$ represents a reference photofinishing pipeline such as the reference photofinishing pipeline depicted in FIG. 5 and discussed in detail below, e.g., Adobe® ACR®. "G" represents one or more Gram matrices of feature layers of a pre-trained VGG-19 encoder. The Gram matrices, for instance, remove locality of VGG features in order to focus on style over content. $H_{1d}$ is a one-dimensional soft histogram applied to a "Y" channel and $H_{2d}$ is a two-dimensional soft histogram applied to a "UV" channel. In an example, the Y channel defines a luminance component (e.g., a linear-space brightness and/or a non-linear space brightness) while the UV channel define a chrominance component. For instance, the "U" component of the UV channel represents a blue projection, and the "V" component of the UV channel represents a red projection. In this way, the style loss 210 embodies visual features of a particular style such as a particular color palette, luminance components, and additional non-content features. The training module 202 is further operable to backpropagate the style loss 210 to the encoder 206.

Such training is not possible using conventional non-machine learning image processing techniques. Conventional machine learning approaches fail to consider intermediate transformations, which leads to inaccuracies and inconsistencies between multiple images finished in the same way. For example, conventional machine learning approaches that involve latent space image editing entangle different visual attributes, are not intuitive to control, and change the image content itself which results in degraded visual quality. Accordingly, a content creator using conventional machine-learning based techniques applies supplemental manual edits to correct inaccuracies, which is time consuming and limits creative opportunities.

Once trained for the particular visual style, the stylization system 116 is operable to receive input data 120 that includes an input digital image 122 that depicts a scene (block 1004). In this example, the input digital image 122 is a raw image that includes an unprocessed raw image file obtained from one or more sensors of an image capture device, e.g., as an Adobe® Digital Negative (DNG) format, Apple® ProRAW format, etc. In various examples, the input data 120 includes a digital video, and the style transfer neural network 204 is configured to apply the particular visual style to the digital video as further described below. In an example, the input data 120 further includes the reference digital content 124, and generation of the stylized digital image 118 is performed automatically and without user intervention responsive to completion of training of the style transfer neural network 204.

The input data 120 further includes metadata 212 such as raw image metadata which includes image statistics and/or capture device information. Conventional machine learning techniques are unable to process various types of raw image metadata, and thus have restricted applicability. By considering the metadata 212, the techniques described herein overcome conventional limitations and are able to stylize raw image inputs from variety of capture devices.

Based on the input data 120, the encoder 206 is operable to determine a feature map 208 of the scene depicted by the input digital image 122 (block 1006). As described above, the feature map 208 describes various global and/or local features of the scene. The encoder 206 further includes an augmentation module 214 that is employed to augment the feature map 208 with image statistics such as one or more histograms that are extracted from the metadata 212 included in the input data 120. In various examples, the image statistics include one or more camera specifications and/or image metadata such as median, quantiles, saturated pixel count, etc. Accordingly, the augmentation module 214 increases the accuracy and completeness of the feature maps 208 by considering the metadata 212.

Based on the feature map 208 as well as the style loss 210, the encoder 206 determines parameter values 216 to apply to the input digital image 122 to incorporate a visual appearance of the particular visual style (block 1008). The parameter values 216, for instance, are visual parameter values that define relative amounts of visual attributes such as temperature, tint, exposure, contrast, saturation, shadows, highlights, texture, etc. to apply to the input digital image 122 to include the particular visual style. In at least one example, the parameter values 216 are configured for use by a reference photofinishing pipeline. The encoder 206 generates the parameter values 216 by feeding the feature map 208 to connected layers of the encoder 206 to consider features of the input digital image 122. Further, the style transfer neural network 204 backpropagates the style loss 210 to the encoder 206 to account for the particular visual style when generating the parameter values 216.

The style transfer neural network 204 leverages a neural photofinisher 218 to generate a stylized digital image 118 by applying the parameter values 216 to the input digital image 122 automatically and without user intervention (block 1010). As further described below with respect to FIGS. 3-6, the neural photofinisher 218 includes one or more neural proxies 220, each respective neural proxy 220 being trained to perform an image processing transformation directly to the input data 120. Each neural proxy 220, for instance, models a processing block of a reference image finishing pipeline, e.g., Adobe® ACR®, and thus is able to perform a respective image processing transformation independent of other transformations performed by other neural proxies 220.

Thus, the neural photofinisher 218 is a fully differentiable pipeline that is operable to receive parameter values 216 from the encoder 206 and implement tailored proxies to adjust visual attributes of the input digital image 122 to an extent determined by the parameter values 216. In this way, the neural photofinisher 218 generates the stylized digital image 118 as an sRGB image depicting the scene of the input digital image 122 in the particular style of the reference digital content 124. In this example, the neural photofinisher 218 is pretrained and is fixed for the training process and generation of the stylized digital image and supports training of the style transfer neural network 204 via backpropagation of the style loss 210 to the encoder 206.

The stylization system 116 also includes a video stylization module 222 that is operable to generate a stylized digital video 224 based on the reference digital content 124 in accordance with the techniques described herein. For example, the input data 120 includes a digital video that includes a sequence of frames as well as metadata 212 associated with the digital video. The video stylization module 222 includes a keyframe module 226 to identify at least two keyframes of the digital video. In some examples, the selection of and/or the number of keyframes is based on the metadata 212 associated with the digital video such as features of the scene, camera data, image statistics, etc. The style transfer neural network 204 determines parameter values 216 for the respective keyframes to incorporate the visual appearance of the particular visual style in accordance with the techniques described above.

The video stylization module 222 further includes an interpolation module 228 that determines parameter values 216 to apply to intermediate frames between the keyframes. Such parameter values 216 are based on the determined parameter values 216 for the keyframes. For instance, the interpolation module 228 generates interpolated parameter values 216 based on the relative position of a particular intermediate frame in the sequence of frames (such as a temporal proximity to one or more of the keyframes) as well as the parameter values 216 for the keyframes.

For example, an intermediate frame in the middle of a first keyframe and a second keyframe has parameter values 216 that are an average of the parameter values 216 of the first keyframe and the second keyframe. In another example, the interpolation module 228 leverages image recognition techniques to generate the interpolated parameter value 216, e.g., based on a similarity of the intermediate frames to the keyframes. Thus, the techniques described herein conserve computational resources by inferring parameter values 216 to apply to intermediate frames to incorporate a particular visual style. Accordingly, the neural photofinisher 218 is operable to apply the respective parameter values to the keyframes, as well as the interpolated parameter values 216 to the intermediate frames. In this way, the techniques described herein enable computationally efficient and accurate generation of stylized digital videos 224 based on reference digital content 124.

Figure 3:
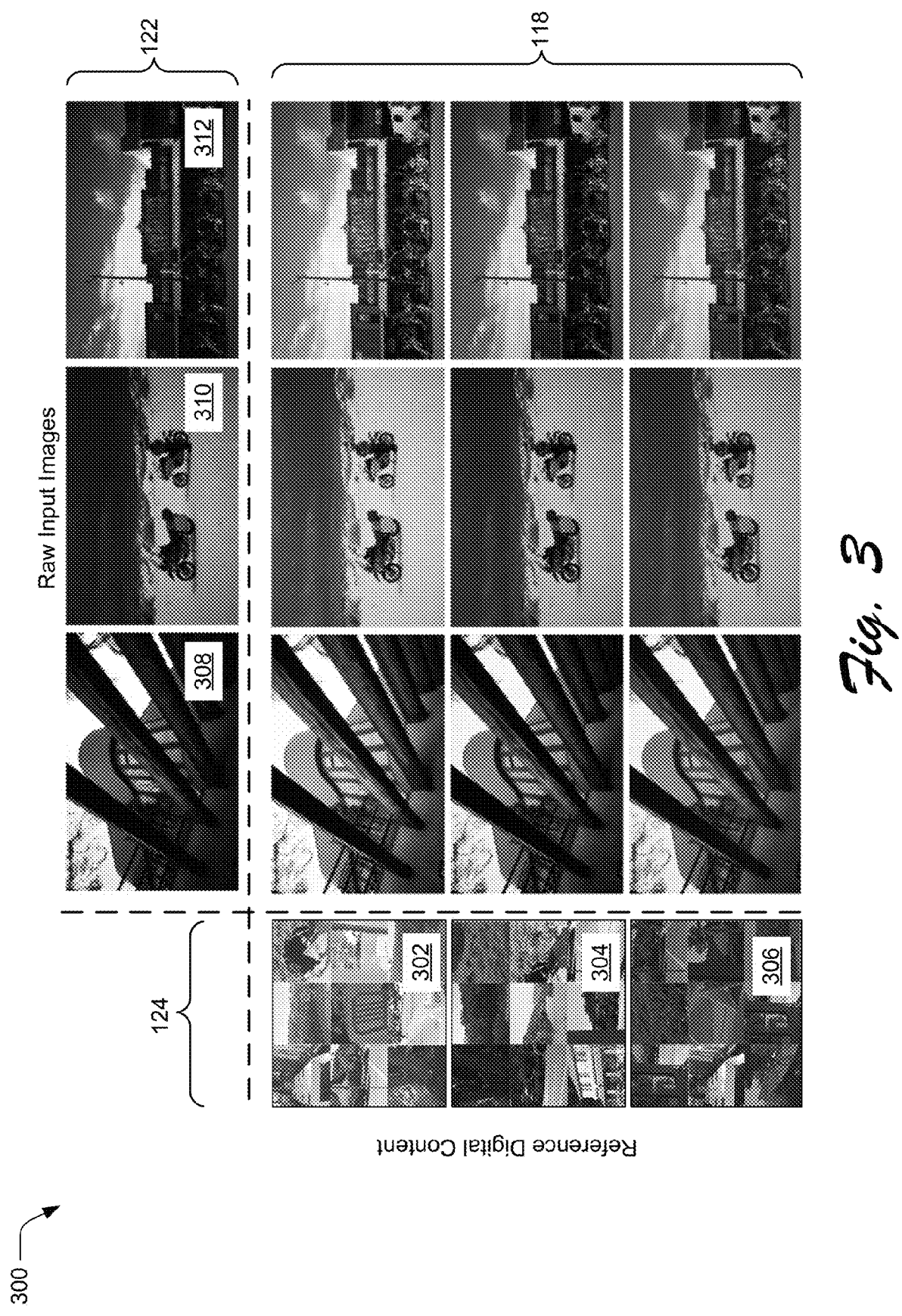
FIG. 3 depicts an example of digital content stylization including generation of a variety of stylized digital images.

FIG. 3 depicts an example 300 of digital content stylization including generation of a variety of stylized digital images 118. In this example, the stylization system 116 is trained in accordance with the techniques described above based on reference digital content 124 that depicts a first reference style 302, a second reference style 304, and a third reference style 306, each reference style having its own particular "look and feel". For instance, the first reference style 302 includes warm tones with a bright color palette, the second reference style 304 includes greenish tints with relatively high contrast, and the third reference style 306 includes soft coloration and relatively dark tones.

The stylization system 116 receives input digital images 122, for instance a first raw input image 308, a second raw input image 310, and a third raw input image 312. Accordingly, the stylization system 116 is operable to generate stylized digital images 118 that depict the scene from the raw input images 308, 310, and 312 in the style of the reference digital content such as the first reference style 302, the second reference style 304, and the third reference style 306. This functionality is not possible using conventional techniques which either involve tedious manual editing or apply a "one-size-fits-all approach" that does not consider reference visual styles.

Neural Photofinisher Training and Architecture

Figure 4:
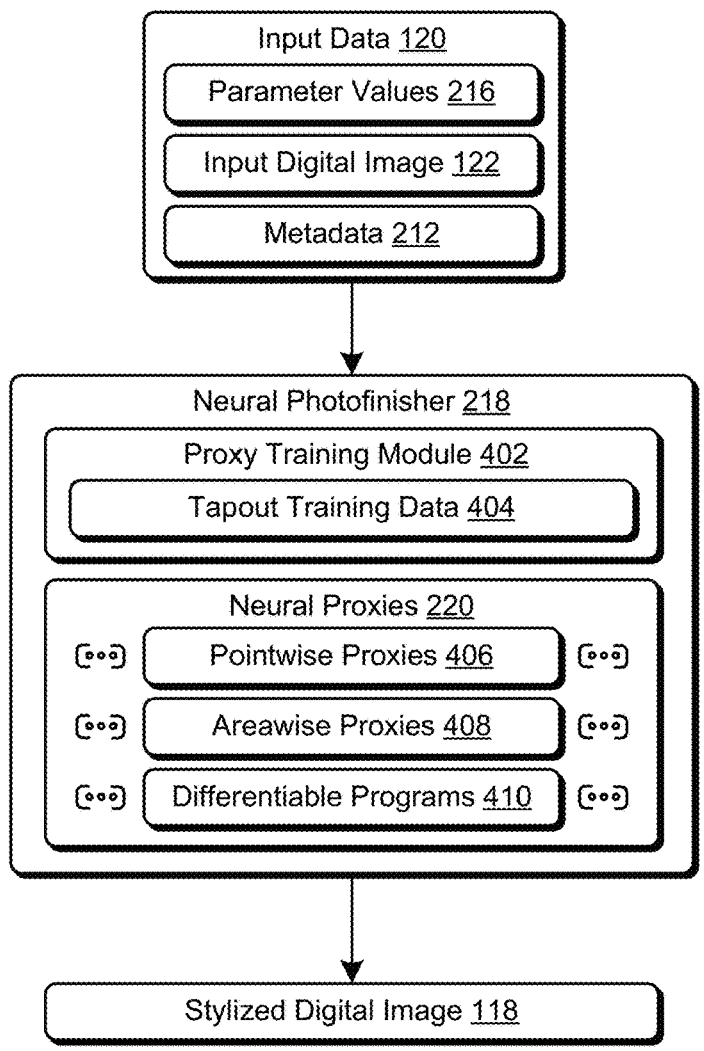
FIG. 4 depicts an example of operation of a neural photofinisher of FIG. 2 in greater detail.
Figure 5:
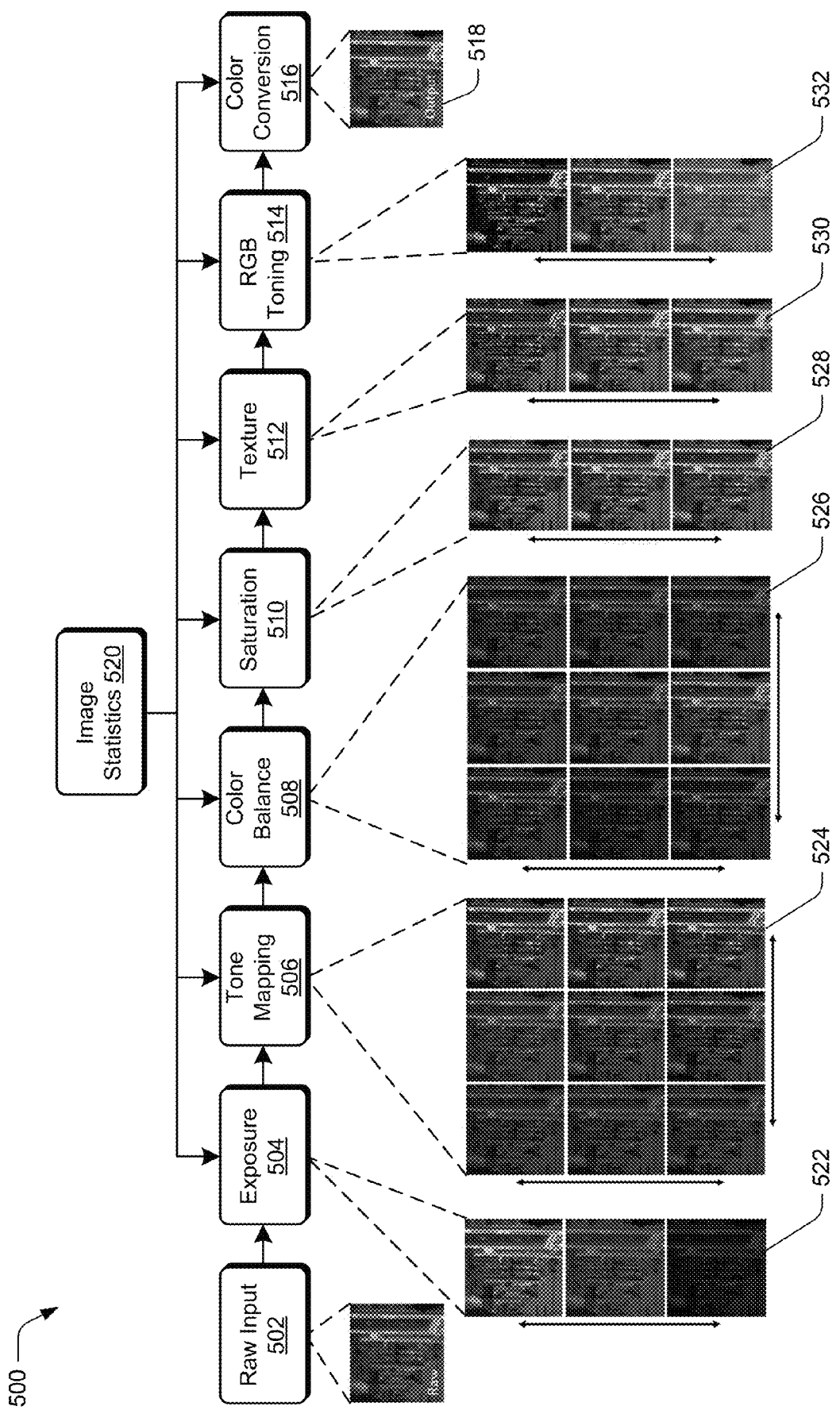
FIG. 5 depicts an example implementation of a reference photofinishing pipeline.
Figure 6:
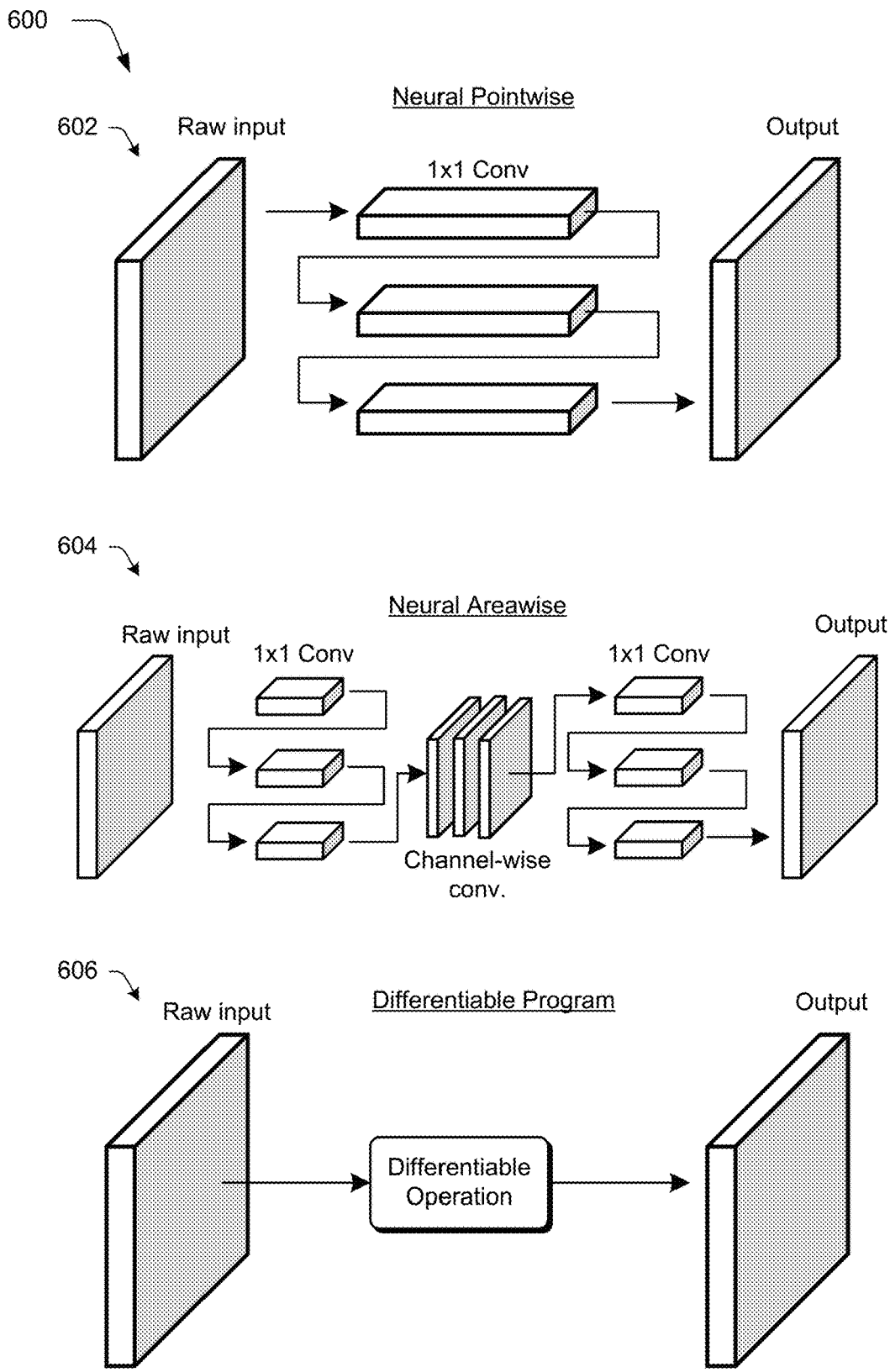
FIG. 6 depicts an example implementation of architectures of neural proxies used by a neural photofinisher.

The following discussion describes architecture of and operations involving a neural photofinisher, e.g., the neural photofinisher 218. In portions of the following discussion, reference will be made to FIGS. 4-6 and in parallel to the procedure 1100 of FIG. 11. FIG. 4 depicts an example 400 of operation of a neural photofinisher such as the neural photofinisher 218 of FIG. 2 in greater detail. FIG. 5 depicts an example implementation 500 of a reference photofinishing pipeline. FIG. 6 depicts an example implementation 600 of architectures of neural proxies used by the neural photofinisher 218

Conventional photofinishing techniques include a series of individual processing blocks to sequentially apply algorithm-based transformations to an input image. Consider, for instance, a reference photofinishing pipeline as depicted in the example implementation 500 of FIG. 5 that represents a conventional photofinishing pipeline. As illustrated, the reference photofinishing pipeline receives a raw input image 502 and includes a series of processing blocks 504-516 to apply a sequence of algorithmic transformations to the raw input image 502 to generate an output image 518. For instance, the reference photofinishing pipeline includes an exposure processing block 504, a tone mapping processing block 506, a color balance processing block 508, a saturation processing block 510, a texture processing block 512, an RGB toning processing block 514, and a color conversion processing block 516. The reference photofinishing pipeline further includes image statistics 520 that are considered at various processing blocks of the pipeline.

Intermediate images that have been "tapped out" at various processing blocks of the pipeline are depicted at 522-532. The transformations, for instance, are based on a user interactively tweaking "slider values" to control various visual attributes. However, due to the sequential topology of the conventional pipeline, transformations applied early in the pipeline cause significant downstream changes later in the pipeline. Further, the nondifferentiable nature of the conventional pipeline obfuscates how changes to slider values and/or the raw input image 502 impact the output image 518. Thus, the user is forced to "guess and check" as to slider settings that result in a visually appealing output which is time consuming and not informative for future image processing actions.

To overcome these limitations, the neural photofinisher 218 includes a proxy training module 402 that is configured to train a plurality of neural proxies 220 of the neural photofinisher 218 to perform photofinishing operations (block 1102). The plurality of neural proxies 220 are trained to perform image processing transformations independent of other neural proxies 220. In an example, each neural proxy 220 includes a neural network that models an individual image processing operation of a reference photofinishing pipeline, such as the reference photofinishing pipeline depicted in FIG. 5. For instance, the neural photofinisher 218 includes a respective neural proxy 220 to model each of the processing blocks 504-516, e.g., an exposure neural proxy, a tone mapping neural proxy, a color balance neural proxy, etc.

This is by way of example and not limitation, and additional neural proxies 220 are considered, such as one or more neural proxies 220 to model dehazing operations, sharpening steps, geometric operations such as cropping and/or lens distortion correction, etc. In some examples, the neural photofinisher 218 is operable to incorporate one or more additional neural proxies, e.g., to represent additional transformations, without changes to the included neural proxies 220. In some examples, multiple neural proxies 220 are used to model a single processing block, e.g., to accurately model multiple aspects of a particular visual attributes. The plurality of neural proxies 220 are trained using tapout training data 404, which includes a variety of intermediate tapouts, e.g., semi-processed digital images that have been extracted from intermediate processing blocks of the reference photofinishing pipeline, examples of which are depicted at 522-532. In some implementations, the neural photofinisher 218 is operable to extract the intermediate tapouts from the reference photofinishing pipeline to generate the tapout training data 404.

Consider an example in which the reference digital pipeline such as the one depicted in FIG. 5 is represented as a pipeline function $f_{pipe}$:

$$I_F = f_{PIPE}(I_R, S, M, H) = f_{PIPE}\left(I_R, \bigcup_{i=1}^{n} S_i, \bigcup_{i=1}^{n} M_i, \bigcup_{i=1}^{n} H_i\right)$$

where $f_{pipe}$ maps a raw image $I_R$ to a finished image $I_F$. The reference pipeline function $f_{pipe}$ is parameterized by slider values $S_i$, camera metadata $M_i$, and cached image statistics $H_i$. Here, $i \in \{1, \ldots, n\}$ indexes a processing block of n processing blocks in the reference photofinishing pipeline. As described above, the reference photofinishing pipeline includes a sequence of processing blocks, which is represented in this example as: $f_{pipe}(I_R, S, M, H) = f_n(\ldots f_1(I_R, S_1, M_1, H_1), S_n, M_n, H_n)$ where $f_i$ represents a processing block. However, reliance on sequential operations results in unpredictable and undesirable downstream effects. Accordingly, the neural photofinisher 218 decomposes the framework of $f_{pipe}$ to model each processing block with a respective neural proxy 220.

For instance, the neural proxies 220 are defined as $\tilde{f}_i^{W_i}$ and are parameterized by weights $W_i$ such that:

$$\tilde{f}_i^{W_i} \approx f_i,$$

$$\forall_i \in \{1 \ldots n\} \text{ where: } f_n \circ \ldots \circ f_2 \circ f_1 \approx \tilde{f}_n^{W_n} \circ \ldots \circ \tilde{f}_2^{W_2} \circ \tilde{f}_1^{W_1}$$

In this example, each neural proxy 220 is trained using the tapout training data 404 such as an image pair $(I_i, I_{i+1})$ from the reference photofinishing pipeline, e.g., the images depicted at 522-532. Thus, training is defined mathematically as:

$$W^* = \bigcup_{i=1}^{n} W_i^* = \underset{\bigcup_{i=1}^{n} W_i}{\operatorname{argmin}} \sum_{i=1}^{n} \mathcal{L}\left(f_i(I_i, S_i, M_i, H_i), \tilde{f}_i^{W_i}(I_i, S_i, M_i, H_i)\right)$$

where $\mathcal{L}$ is an image space loss function.

By training the neural proxies 220 individually using the tapout training data 404, rather than end-to-end training as in conventional monolithic approaches, the neural photofinisher 218 is able to represent a greater variety of transformations (and thus a greater range of visual attributes) with increased accuracy. For instance, consider a conventional monolithic technique that trains a network using input images and output images of a reference photofinishing pipeline, e.g., $(I_R, I_F)$. Because of its sequential nature, as images propagate through the reference photofinishing pipeline a range of samples from $f_i$, e.g., a first processing block, does not adequately cover a domain of $f_{i+1}$, e.g., a second processing block. Propagation through the pipeline compounds these effects, and accordingly conventional techniques experience a phenomenon known as "vanishing samples," where cases (e.g., various slider values) are overlooked because of the end-to-end approach.

Further, at various stages of the reference photofinishing pipeline transformations effected by processing blocks are based in part on cached image statistics, e.g., image statistics 520 that include one or more histograms "H". Conventional machine learning techniques have a limited receptive field, and as such are unable to apply such cached image statistics. Accordingly, conventional techniques paint an incomplete picture with respect to image transformations performed by a reference photofinishing pipeline. The techniques described herein overcome the issue of vanishing samples as well as enable consideration for cached image statistics by training the neural proxies 220 individually using the tapout training data 404.

An additional advantage of individual neural proxy 220 training is that these techniques reduce an amount of training data, thus conserving computational resources. By way of example, for each neural proxy 220 in the neural photofinisher 218, $O(\Sigma_{i=1}^{n} k^{|S_i|})$ number of samples are used as training data, where k represents a number of values per slider in the reference photofinishing pipeline, and $|S_i|$ represents a number of sliders in a particular processing block of the reference photofinishing pipeline that a neural proxy 220 is modeling. In this example, $|S_i| \leq 3$ and there are fourteen blocks. Using the techniques described herein approximately ten training images are used per neural proxy 220, thus approximately 10×14 raw images are obtained for training. However, conventional monolithic techniques that model a reference pipeline end-to-end utilize $O(k^{|S|})$ samples, and thus would use $10^{14}$ images to model the reference photofinishing pipeline. Further, because such conventional machine learning approaches do not consider intermediate transformations, these techniques fail to accurately model complex transformations present in the reference photofinishing pipeline.

Because the image transformations performed by each processing block of the reference photofinishing pipeline include different operations, various architectures are implemented for the neural proxies 220. For instance, the neural proxies 220 include pointwise proxies 406 and areawise proxies 408. In various examples, the neural photofinisher 218 also includes proxies such as one or more differentiable programs 410 that model transformations that are explicitly defined by metadata associated with an input image, e.g., the metadata 212 as further described below. These architectures are shown an example implementation 600 of FIG. 6 in first stage 602, second stage 604, and third stage 606. For instance, first stage 602 depicts an example of a pointwise proxy 406, second stage 604 depicts an example of an areawise proxy 408, and the third stage 606 depicts an example of a differentiable program 410.

The pointwise proxies 406 represent transformations that affect an input digital image 122 at a per-pixel level without consideration of neighboring pixels. Examples of such transformations include saturation, vibrance, and RGB Toning transformations. This is by way of example and not limitations, and a variety of pixel level transformations are considered. In an example, the pointwise proxies 406 model the transformations using a multilayer perceptron ("MLP") with three layers as depicted in first stage 602 of FIG. 6. The three-layer MLP operates on one pixel at a time, unlike conventional convolutional neural networks with non-unity kernel windows.

In an example to train the pointwise proxies 406, the proxy training module 402 is operable to densely sample an RGB cube $x \in [0, 1]^3$ as well as associated sliders $s \in [0, 1]^{|S_i|}$ with one hundred samples per axis. The training module 402 obtains a corresponding $y = f_i(x, s)$ where $f_i$ represents an individual processing block. Since $f_i$ is per-pixel, training in this way covers a transformation space for the processing block. For pointwise proxies 406, the training module 402 implements an L1-loss $\mathcal{L} = \mathcal{L}_1$.

The areawise proxies 408 represent areawise transformations such as nonlinear filters that are dependent on a pixel's neighbors. Examples of areawise transformations include tone mapping and texture transformations. As depicted in second stage 604 of FIG. 6, the areawise proxies 408 model the transformations using a network architecture that applies convolutional filters in a per-channel manner, for instance to preserve a color space of an input digital image 122. The areawise proxies 408 also incorporate 1×1 cross-channel layers to accommodate potential cross-channel modifications, e.g., dynamic range compression. As part of training the areawise proxies, the proxy training module 402 is operable to implement a combination of a per-pixel L1-loss (e.g., $\mathcal{L}_1$ as described above) as well as a spatial gradient loss $\mathcal{L}_\nabla$ to penalize errors in the way the transformation affects pixel neighborhoods. Accordingly, the loss implemented by the proxy training module 402 is: $\mathcal{L} = \mathcal{L}_1 + \mathcal{L}_\nabla$.

In various examples, one or more of the neural proxies 220 (e.g., the pointwise proxies 406 and/or the areawise proxies 408) concatenate image statistics (e.g., global image statistics of the input digital image 122 such as histograms, quantiles, per-channel saturated pixel counts, etc.) found in the metadata 212, e.g., to be applied along a channel dimension of a respective neural proxy 220. In this way, the techniques described herein overcome conventional limitations associated with cached image statistics.

In some examples, the neural photofinisher 218 includes one or more differentiable programs 410 that model transformations that are explicitly defined by metadata associated with an input image, e.g., metadata 212. In an example, a differentiable program 410 represents a color conversion transformation with a 3×3 matrix multiply operation. In another example, a differentiable program 410 represents gamma correction, which is a per-pixel power function. In various examples, the differentiable programs 410 are based on metadata 212 included in the input data 120. For instance, image statistics parameterize the differentiable program 410. In this way, the techniques described herein are applicable to a variety of different image capture devices.

Once the neural proxies 220 are trained and configured, the neural photofinisher 218 is operable to receive input data 120 that includes an input digital image 122, metadata 212 associated with the input digital image as described above, and one or more parameter values 216 that define relative amounts of respective visual attributes to apply to the digital image (block 1104). In some examples, the input digital image 122 is representative of multiple images, e.g., a digital video. In various implementations, the parameter values 216 are generated automatically and without user intervention, such as by using a separate neural network (e.g., by the style transfer neural network 204), according to preset values, based on previous settings, etc. In another example, the parameter values 216 are user defined, e.g., by a content creator in a user interface 110.

Based on the parameter values 216, the neural photofinisher 218 is operable to generate a stylized digital image 118 (block 1106). The neural photofinisher 218 does so by leveraging the neural proxies 220 (e.g., the pointwise proxies 406, areawise proxies 408, and the differentiable programs 410) to apply the parameter values 216 to the input digital image 122, e.g., by applying order independent transformations to the input digital image 122. In this way, the differentiable neural photofinisher 218 provides accurate photofinishing capabilities while disentangling visual attributes from one another to provide semantic meaning to image transformations. Further, by including multiple neural proxies 220 to represent different image transformations, the neural photofinisher 218 facilitates training for diverse applications and/or implementations. In some examples, the neural photofinisher 218 is configurable to be incorporated into a variety of existing machine learning systems such as to support training and/or operations on raw image data.

Slider Regression Using a Neural Photofinisher

Figure 7:
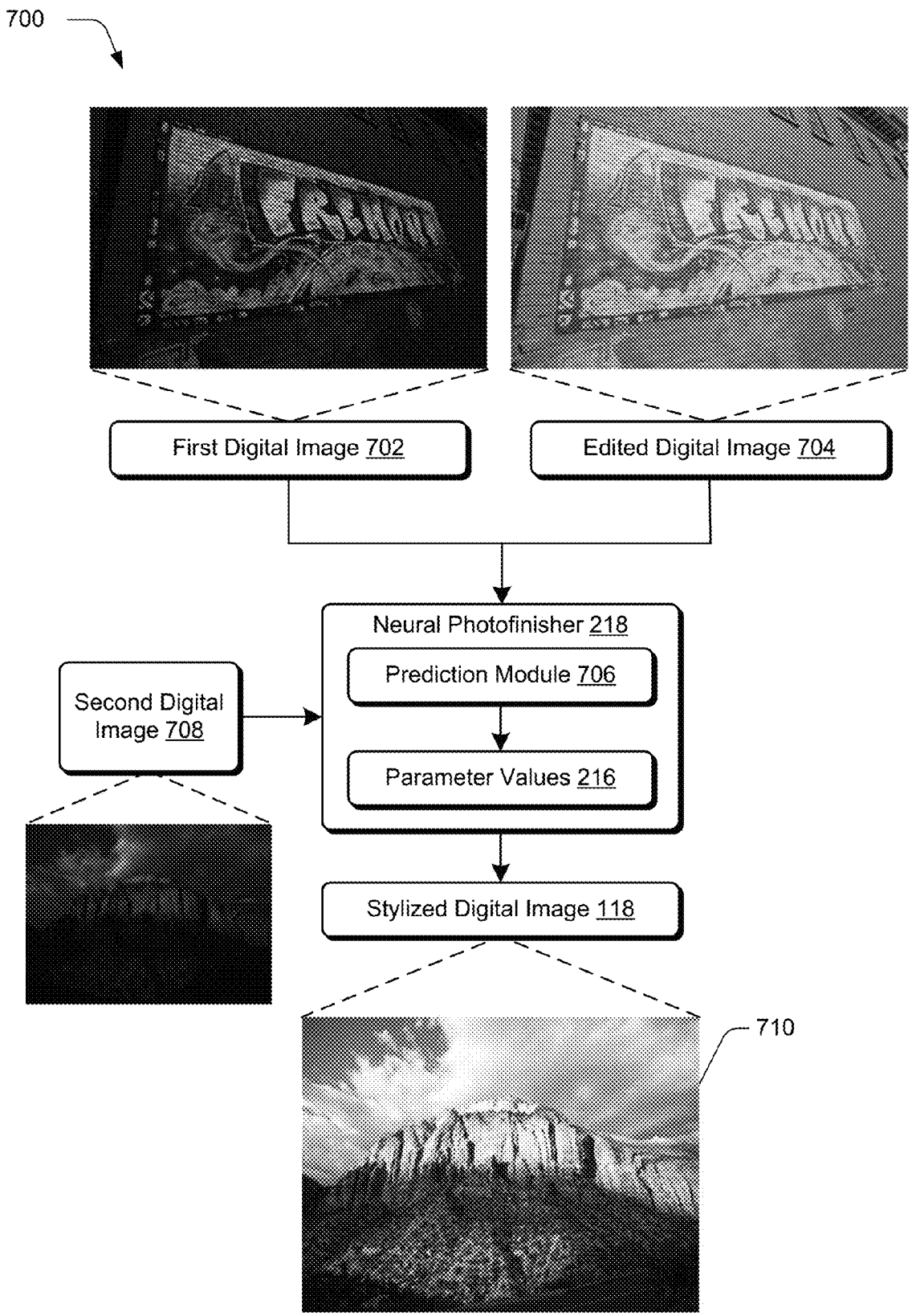
FIG. 7 depicts an example implementation of a neural photofinisher to perform slider regression operations.

FIG. 7 depicts an example implementation 700 of a neural photofinisher to perform slider regression operations. A variety of conventional image processing techniques are considered "black-box," meaning that while inputs and outputs are obtainable, intermediate states and/or internal transformations are not accessible. For instance, consider a mobile device that includes an image signal processing (ISP) pipeline to convert camera sensor measurements into recognizable images. The input (e.g., the raw camera sensor data) and the output (a finished image) are available, however the ISP itself is a proprietary closed system. In various scenarios it is desirable to impart visual effects that emulate image transformations effected by the reference photofinishing pipeline, e.g., the ISP pipeline. Accordingly, in this example the neural photofinisher 218 is leveraged to determine parameter values 216 to generate a stylized digital image 118 that appears as if it were processed by the reference photofinishing pipeline.

To do so, the neural photofinisher 218 receives input data that includes a first digital image 702 and a corresponding edited digital image 704 (block 1202). For instance, the first digital image 702 is an unprocessed image (e.g., a raw image file) and the corresponding edited digital image 704 is a finished image that has been processed by a reference photofinishing pipeline, e.g., an ISP pipeline of a camera of a mobile device as described above, with a particular visual style. For instance, the particular visual style is relatively high contrast, with a vibrant color scheme.

The neural photofinisher 218 includes a prediction module 706 that is operable to predict parameter values 216 to generate the corresponding edited digital image 704 with the particular visual style imparted by the reference photofinishing pipeline (block 1204). For instance, the predicted parameter values 216 represent relative amounts of visual attributes for the neural photofinisher 218 to apply to a digital image to incorporate the particular visual style of the reference photofinishing pipeline. In another example, the prediction module 706 predicts parameter values 216 that correspond to slider values for a reference photofinishing pipeline, e.g., Adobe® ACR®.

Consider an example in which the first digital image 702 is represented as $I_R$ and the corresponding edited digital image 704 is represented as $I_{ISP}$. The prediction module 706 is operable to set an $I_{target}$ to $I_{ISP}$ and solve the following equation:

$$S^* = \mathrm{argmin}_S \mathcal{L}(I_{TARGET}, f_{PIPE}(I_R, S, M, H))$$

to solve for the predicted parameter values $S^*$. In this example, the prediction module 706 is configured to minimize a loss between the edited digital image 704 and an image generated based on the predicted parameter values 216. For instance, the prediction module implements a first-order stochastic gradient descent to predict the parameter values 216. In one or more examples, the predicted parameter values 216 are further based on camera metadata, e.g., metadata associated with the camera of the mobile device. In this way, the neural photofinisher 218 is operable to perform slider regression for a variety of ISP's.

The neural photofinisher 218 next receives a second digital image 708 (block 1206). The second digital image 708, for instance, is an unprocessed image such as a raw digital image. The neural photofinisher 218 is operable to generate a stylized digital image 118 by applying the predicted visual parameter values 216 to the second digital image 708 (block 1208). The neural photofinisher 218 does so, for instance, using the neural proxies 220 as described above. In an example in which the predicted parameter values 216 correspond to slider values for a reference photofinishing pipeline the stylized digital image is generated by the reference photofinishing pipeline. The stylized digital image 118 is depicted at 710 and includes the content of the second digital image 708 in the style of the edited digital image 704. In this way, the neural photofinisher 218 is leveraged to generate stylized digital images 118 to "look like" the images were processed using a black-box ISP.

Demosaicing and Denoising Network Using Neural Photofinisher

Figure 8:
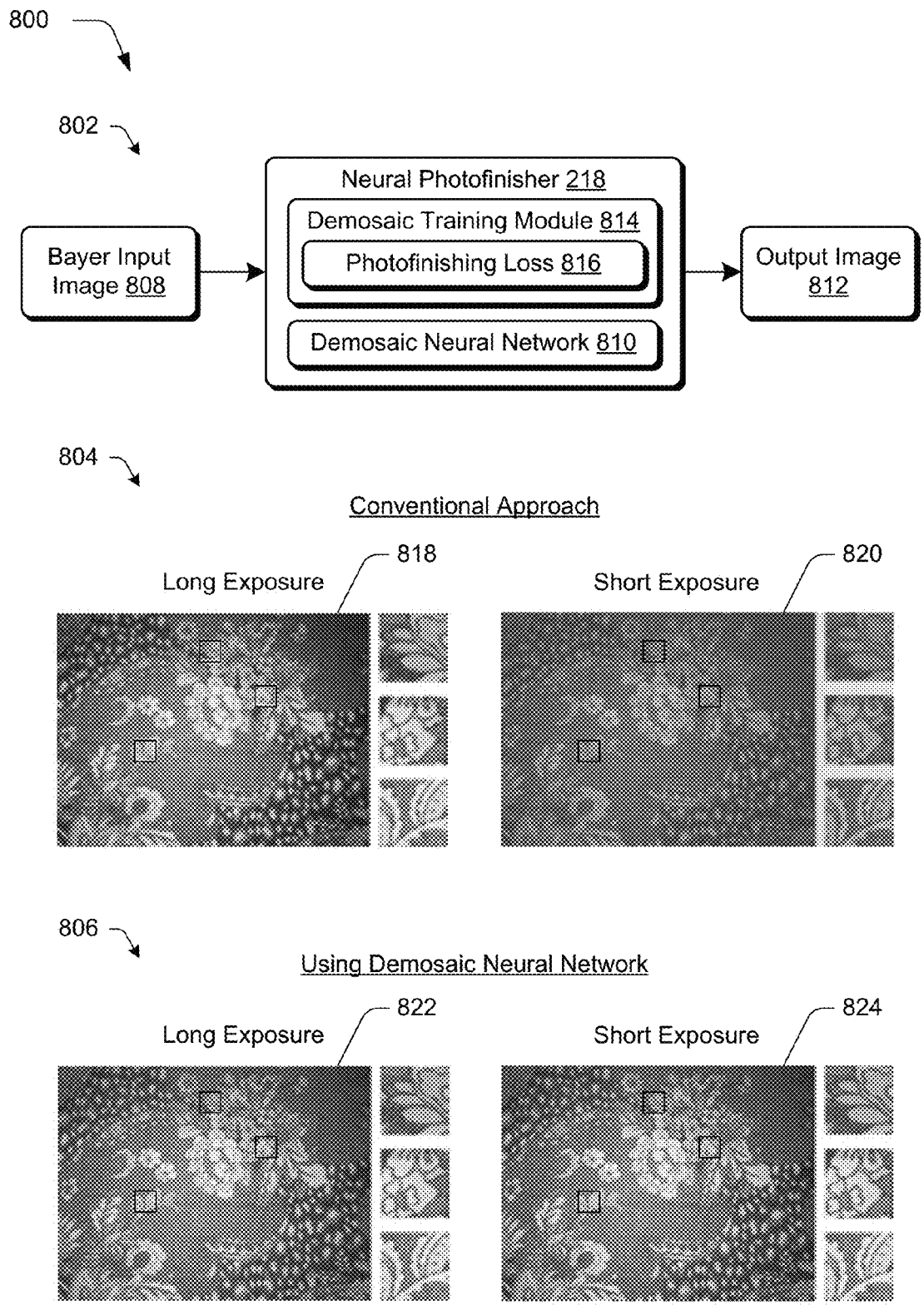
FIG. 8 depicts an example implementation of a neural photofinisher to perform denoising and demosaicing operations.

FIG. 8 depicts an example implementation 800 of a neural photofinisher to perform denoising and demosaicing operations in first stage 802, second stage 804, and third stage 806. In general, image capture devices record color using one or more filters to select wavelength bands, for instance producing a Bayer image such as an RGGB Bayer configuration. Demosaicing refers to a process to filter the wavelength bands to obtain multi-channel raw images, e.g., full color images, and thus often precedes photofinishing operations. In conventional techniques, the presence of noise poses a significant problem to demosaicing operations and often results in finished images with poor quality. Generally, images with short-exposure are considered "noisy" while long-exposure images are considered "clean," e.g., with decreased noise. In this example, the neural photofinisher 218 enables backpropagation of gradients onto a Bayer input image 808 to support training of a joint demosaicing and denoising neural network, e.g., a demosaic neural network 810, to produce a clean (e.g., denoised and demosaicked) output image 812 regardless of exposure time. When compared with conventional demosaicing techniques, the techniques described herein produce output images 812 with better quality and an increased signal-to-noise ratio.

As depicted in a first stage 802, the neural photofinisher 218 includes a demosaic training module 814 that is operable to train the demosaic neural network 810 to reconstruct clean outputs from Bayer images with varying levels and distributions of noise. That is, the demosaic neural network 810 is trained to generate an output image such as a linear RGB image, that resembles a long-exposure image (and therefore less noise) regardless of exposure time. To do so, in an example the demosaic training module 814 utilizes training data that includes image pairs with a short exposure Bayer image and a long-exposure Bayer image to calculate a photofinishing loss 816.

The photofinishing loss 816 is configurable to include a long exposure loss term $\mathcal{L}_{LONG}$ and a short exposure loss term $\mathcal{L}_{SHORT}$. To determine the long exposure term, the demosaic training module 814 trains the demosaic neural network 810 to model a reference demosaicer, such as a demosaicer of a reference photofinishing pipeline such as Adobe® ACR®. The demosaic training module 814 calculates $\mathcal{L}_{LONG}$ as:

$$\mathcal{L}_{LONG} = \mathcal{L}(f_{pipe}(f_{NN}(B_{LONG})), f_{pipe}(f_{DE}(B_{LONG})))$$

where $f_{pipe}$ represents the reference photofinishing pipeline, $f_{NN}$ represents the demosaic neural network 810, $f_{DE}$ represents the reference demosaicer and $B_{LONG}$ represents an example long exposure Bayer image, e.g., from the training data. In this way, the demosaic neural network is trained to process a long exposure Bayer image to produce a noise free demosaicked output image.

Further, the demosaic neural network 810 is trained to denoise a short-exposure Bayer image to produce a clean output image. Accordingly, the demosaic training module 814 calculates the short exposure loss term $\mathcal{L}_{SHORT}$ as:

$$\mathcal{L}_{SHORT} = \mathcal{L}(f_{pipe}(f_{NN}(B_{SHORT})), f_{pipe}(f_{DE}(B_{LONG})))$$

where $B_{SHORT}$ represents a short exposure Bayer image from the training data. Accordingly, once trained the demosaic neural network 810 is configured to receive a Bayer input image 808 and, regardless of exposure time, generate a denoised output image 812. In various examples, the neural photofinisher 218 implements the demosaic neural network 810 as part of photofinishing operations, e.g., in conjunction with transformations performed by the neural proxies 220.

Second stage 804 depicts an example of a conventional demosaicing technique. A first image 818 represents an output image based on a long exposure Bayer input, while a second image 820 represents an output image based on a short exposure Bayer image, e.g., a noisy Bayer input image that depicts the same content as the first image 818. As illustrated, the second image 820 displays visual inconsistencies with the first image 818, for instance having reduced clarity and reduced expressiveness. Accordingly, the conventional demosaicing technique fails to account for noise present in the short exposure Bayer input image.

Third stage 806 depicts an example of demosaicing and denoising using the techniques described herein. For instance, third stage 806 depicts a third image 822 and a fourth image 824 that have been processed by the neural photofinisher 218 in accordance with the techniques described above. The third image 822 represents an output image based on a long exposure Bayer input, while fourth image 824 represents an output image based on a short exposure Bayer image, e.g., a noisy Bayer input image that depicts the same content as the first image 818. As illustrated, the fourth image 824 is visually similar to the third image 822. Further, the fourth image 824 has an increased signal-to-noise ratio when compared with the second image 820. Accordingly, the demosaic neural network 810 demonstrates an improved demosaicing and denoising ability for short exposure Bayer images when compared with conventional approaches.

Adversarial Perturbation Generation Using Neural Photofinisher

In another implementation, the neural photofinisher 218 is used to determine an adversarial attack that is able to "fool" an image classifier. Generally, image classifiers receive an image and determine "what" is represented by the image. For instance, an image classifier receives an image of a golden retriever and classifies the image as depicting a "dog." The adversarial attack includes a perturbation added to a raw image that results in the image classifier incorrectly classifying a corresponding finished image based on a first set of parameter values, while correctly classifying a corresponding finished image based on a different set of parameter values.

Consider an example in which Si represents a first set of parameter values while $S_2$ represents a second set of parameter values. The neural photofinisher 218 determines a perturbation "δ" such that an output of $f_{pipe}$ ($I_R+\delta$, $S_1$, M, H) is incorrectly classified by an image classifier "G", while an output of $f_{pipe}$ ($I_R+\delta$, $S_2$, M, H) is properly classified. To do so, the neural photofinisher 218 solves the following optimization problem:

$$\delta^* = \underset{\delta}{\mathrm{argmax}}(\mathcal{L}_{CE}(I_{GT}, G(f_{PIPE}(I_R + \delta, S_1, M, H))) - \mathcal{L}_{CE}(I_{GT}, G(f_{PIPE}(I_R + \delta, S_2, M, H))))$$

$$\text{s.t. } \|\delta\|_2 < \epsilon,$$

where $\mathcal{L}_{CE}$ represents a cross-entropy loss, $I_{GT}$ represents a ground truth label, and ϵ represents a maximum perturbation which in this example ϵ=0.3.

Figure 9:
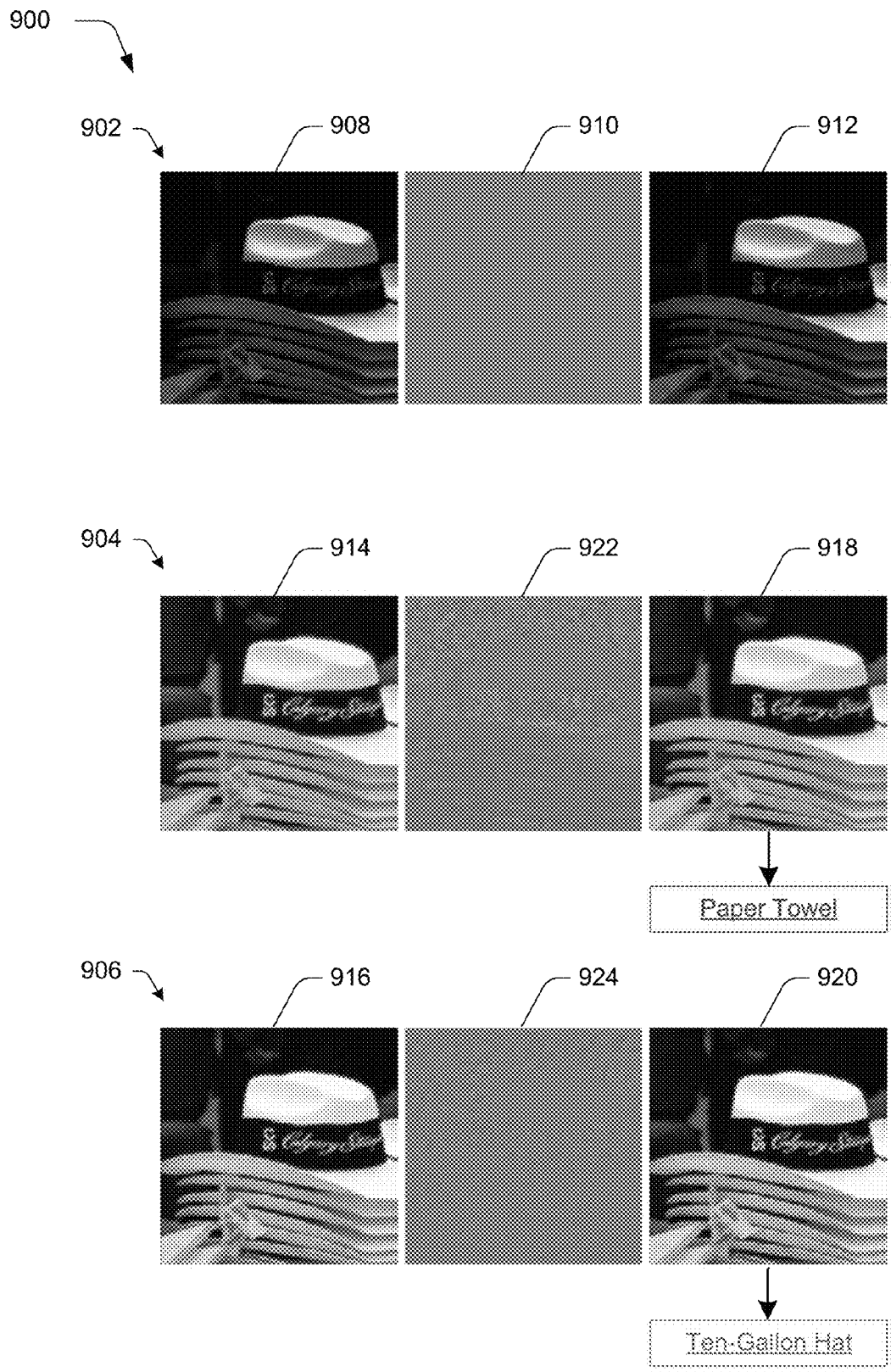
FIG. 9 depicts an example implementation of a neural photofinisher to generate adversarial perturbations.

FIG. 9 depicts an example implementation 900 of a neural photofinisher 218 to generate adversarial perturbations in a first stage 902, a second stage 904, and a third stage 906. As shown in first stage 902, a raw input image 908 has a perturbation 910 (e.g., as determined in accordance with the techniques described above) applied to generate a perturbed raw input image 912. Second stage 904 depicts an example of photofinishing operations on the perturbed raw input image 912 with a first set of parameter values "$S_1$," while third stage 906 depicts an example of photofinishing the perturbed raw input image 912 with a second set of parameter values "$S_2$." Digital images 914 and 916 represent "clean" images based on the unperturbed raw input image 908, while the digital images 918 and 920 represent perturbed finished images based on the perturbed raw input image 912.

The digital image 922 demonstrates the effect of the first set of visual parameters on the perturbation 910 and the digital image 924 demonstrates the effect of the second set of visual parameters on the perturbation 910. As illustrated, the first set of visual parameters cause the perturbation 910 to become more pronounced. Accordingly, when input to an image classifier, the digital image 918 is incorrectly classified as "paper towel" while the digital image 920 is correctly classified as a "ten-gallon hat." In this way, the neural photofinisher 218 provides insight into parameter values 216 that are prone to causing and/or exacerbating perturbations.

Further, these techniques provide a modality to efficiently generate vast amounts of training images for image classification systems as well as a variety of additional machine learning tasks. Consider an example to generate training data for an image classification system. The neural photofinisher 218 is leveraged to receive an input digital image 122 such as a raw input image that depicts a scene, and using the techniques described herein generate a variety of stylized digital images 118 that depict the scene but have different parameter values 216 applied. In some examples, the neural photofinisher 218 includes a randomizer to determine a variety of parameter values 216 to apply to the raw input image. In an alternative or additional example, the neural photofinisher 218 receives a set of digital images, and using the techniques described herein applies variable parameter values 216 to each digital image of the set of digital images.

Thus, the neural photofinisher 218 supports differentiable data augmentation techniques to efficiently expand the size of training data sets. In turn, the expanded training data sets are usable to train a variety of machine learning models, e.g., image classification systems, with improved accuracy.

Example System and Device

Figure 13:
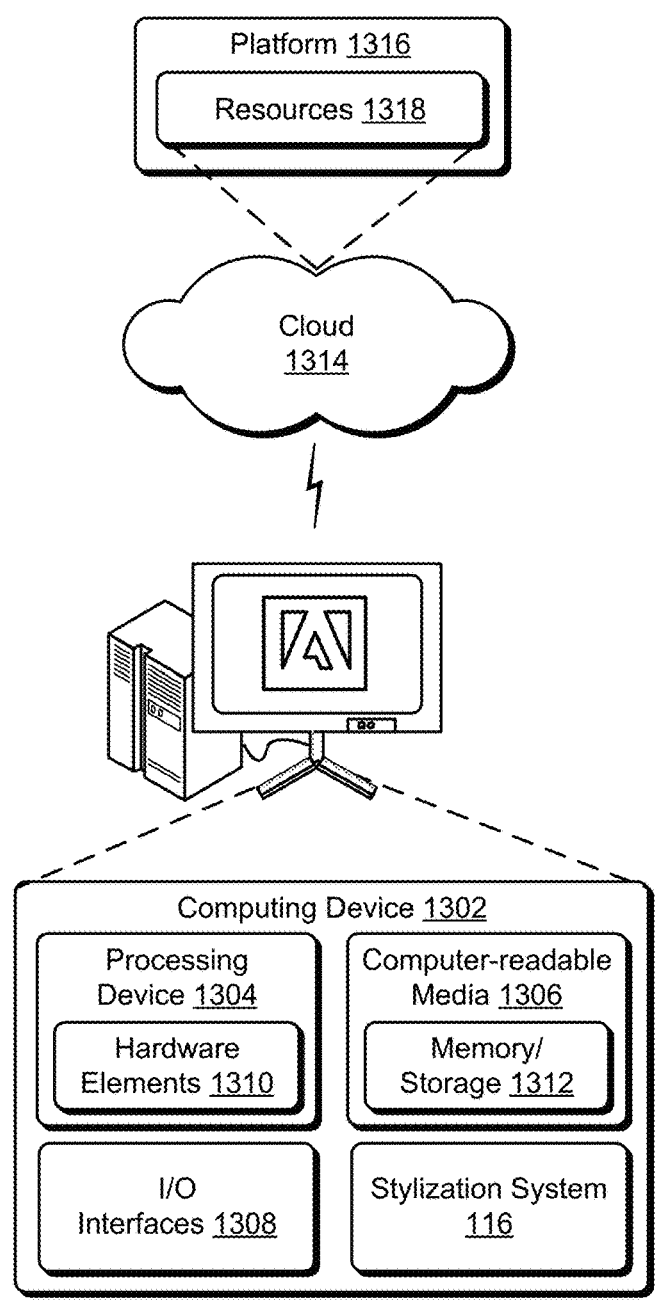
FIG. 13 illustrates an example system including various components of an example device that can be implemented as any type of computing device as described and/or utilized with reference to FIGS. 1-12 to implement embodiments of the techniques described herein.

FIG. 13 illustrates an example system generally at 1300 that includes an example computing device 1302 that is representative of one or more computing systems and/or devices that implement the various techniques described herein. This is illustrated through inclusion of the stylization system 116. The computing device 1302 is configurable, for example, as a server of a service provider, a device associated with a client (e.g., a client device), an on-chip system, and/or any other suitable computing device or computing system.

The example computing device 1302 as illustrated includes a processing device 1304, one or more computer-readable media 1306, and one or more I/O interface 1308 that are communicatively coupled, one to another. Although not shown, the computing device 1302 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1304 is representative of functionality to perform one or more operations using hardware. Accordingly, the processing device 1304 is illustrated as including hardware element 1310 that is configurable as processors, functional blocks, and so forth. This includes implementation in hardware as an application specific integrated circuit or other logic device formed using one or more semiconductors. The hardware elements 1310 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1306 is illustrated as including memory/storage 1312. The memory/storage 1312 represents memory/storage capacity associated with one or more computer-readable media. The memory/storage 1312 includes volatile media (such as random access memory (RAM)) and/or nonvolatile media (such as read only memory (ROM), Flash memory, optical disks, magnetic disks, and so forth). The memory/storage 1312 includes fixed media (e.g., RAM, ROM, a fixed hard drive, and so on) as well as removable media (e.g., Flash memory, a removable hard drive, an optical disc, and so forth). The computer-readable media 1306 is configurable in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1302. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1302, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1310. The computing device 1302 is configured to implement particular instructions and/or functions corresponding to the software and/or hardware modules. Accordingly, implementation of a module that is executable by the computing device 1302 as software is achieved at least partially in hardware, e.g., through use of computer-readable storage media and/or hardware elements 1310 of the processing device 1304. The instructions and/or functions are executable/operable by one or more articles of manufacture (for example, one or more computing devices 1302 and/or processing devices 1304) to implement techniques, modules, and examples described herein.

The techniques described herein are supported by various configurations of the computing device 1302 and are not limited to the specific examples of the techniques described herein. This functionality is also implementable all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 abstracts resources and functions to connect the computing device 1302 with other computing devices. The platform 1316 also serves to abstract scaling of resources to provide a corresponding level of scale to encountered demand for the resources 1318 that are implemented via the platform 1316. Accordingly, in an interconnected device embodiment, implementation of functionality described herein is distributable throughout the system 1300. For example, the functionality is implementable in part on the computing device 1302 as well as via the platform 1316 that abstracts the functionality of the cloud 1314.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
a memory component; and
a processing device coupled to the memory component, the processing device configured to perform operations including:
receiving a neural network configured to perform digital image style transfer operations based on reference digital content with a particular visual style and a style loss for the particular visual style;
receiving input data that includes a digital image depicting a scene;
determining, by an encoder of the neural network and based on the input data, a feature map of the scene depicted by the digital image;
determining, by the neural network, visual parameter values to apply to the digital image to incorporate a visual appearance of the particular visual style based on the feature map and the style loss; and
generating, by a neural photofinisher, a stylized digital image by applying the determined visual parameter values to the digital image automatically and without user intervention.

2. The system as described in claim 1, wherein the reference digital content includes a plurality of frames from a digital video that represents the particular visual style, the input data includes an unprocessed raw image file obtained from one or more sensors of an image capture device, and the stylized digital image is an sRGB image.

3. The system as described in claim 1, wherein the neural photofinisher includes a plurality of neural proxies, each respective neural proxy being trained to perform an image processing transformation directly to the input data independent of other neural proxies of the plurality of neural proxies.

4. The system as described in claim 1, wherein the style loss includes a luma loss term to identify a perceptual brightness of the particular visual style, a chroma loss term to determine a color palette of the particular visual style, and a gram loss term that identifies non-content features of the particular visual style.

5. The system as described in claim 1, wherein the system is operable to augment the feature map with image statistics including histograms based on the input data.

6. The system as described in claim 1, wherein the visual parameter values define relative amounts of visual attributes including temperature, tint, exposure, contrast, and saturation.

7. The system as described in claim 1, wherein the system is trained to perform style transfer operations for a plurality of visual styles, and wherein the operations include receiving an input to select one of the plurality of visual styles and the stylized digital image incorporates a visual appearance of the selected visual style.

8. The system as described in claim 1, wherein the input data includes a digital video including a sequence of frames and metadata associated with the digital video, the operations further including:
identifying at least two keyframes of the digital video based on the metadata;
determining visual parameter values to apply to the at least two keyframes to incorporate the visual appearance of the particular visual style; and
generating a stylized digital video by applying the determined visual parameter values to the at least two keyframes and interpolating visual parameter values to be applied to frames between the at least two keyframes based on the determined visual parameter values.

9. A method comprising:
configuring, by a processing device, a plurality of neural proxies of a differentiable neural photofinisher to perform photofinishing operations using intermediate images extracted from a reference photofinishing pipeline;

receiving, by the processing device, input data that includes a digital image and one or more parameter values that define relative amounts of respective visual attributes to apply to the digital image; and generating, by the processing device, a stylized digital image by applying order independent transformations to the digital image using the plurality of neural proxies based on the one or more parameter values.

10. The method as described in claim 9, wherein each respective neural proxy models an individual image processing operation of the reference photofinishing pipeline.

11. The method as described in claim 9, wherein the plurality of neural proxies includes a neural proxy to model a saturation transformation, a neural proxy to model a vibrance transformation, and a neural proxy to model RGB toning transformation, the neural proxies to model the saturation, vibrance, and RGB toning transformations including a multilayer perceptron that operates at a pixel level.

12. The method as described in claim 9, wherein the plurality of neural proxies includes a neural proxy to model a tone mapping transformation and a neural proxy to model a texture transformation, the neural proxies to model the tone mapping and texture transformations having a network architecture that applies convolutional filters per-channel to preserve a color space of the stylized digital image.

13. The method as described in claim 9, wherein the plurality of neural proxies includes a differentiable program to model a color conversion transformation and a differentiable program to model a gamma correction transformation, the differentiable program to model the color conversion and gamma correction transformations based on metadata associated with the digital image.

14. The method as described in claim 9, wherein the order independent transformations applied by the plurality of neural proxies are based in part of image statistics associated with the input data.

15. The method as described in claim 9, wherein the digital image is a short exposure Bayer image, and wherein the plurality of neural proxies includes a neural proxy to model a demosaicing operation, the neural proxy to model a demosaicing operation configured to apply a transformation to the digital image to generate the stylized digital image with a visual appearance of a long exposure image.

16. The method as described in claim 9, wherein the input data includes a first set of parameter values to generate a first stylized digital image based on the digital image and a second set of parameter values to generate a second stylized digital image based on the digital image, and wherein the differentiable neural photofinisher is configured to generate a perturbation to apply to the digital image such that an image classifier incorrectly classifies the first stylized digital image and correctly classifies the second stylized digital image.

17. A non-transitory computer-readable storage medium storing executable instructions, which when executed by a processing device, cause the processing device to perform operations comprising:

receiving input data that includes a first digital image and a corresponding edited digital image with a particular visual style that has been processed by a reference photofinishing pipeline;

predicting, by a differentiable neural photofinisher, visual parameter values to generate the corresponding edited digital image with the particular visual style imparted by the reference photofinishing pipeline;

receiving a second digital image; and generating, by one or more neural proxies of the differentiable neural photofinisher that are each configured using intermediate images from an additional photofinishing pipeline to perform an order independent image processing transformation, a stylized digital image with the particular visual style by applying the predicted visual parameter values to the second digital image.

18. The non-transitory computer-readable storage medium as described in claim 17, wherein the reference photofinishing pipeline is an image signal processing (ISP) pipeline of a camera of a mobile device.

19. The non-transitory computer-readable storage medium as described in claim 18, wherein predicting the visual parameter values is based in part on camera metadata associated with the camera of the mobile device.

20. The non-transitory computer-readable storage medium as described in claim 17, wherein the differentiable neural photofinisher implements a first-order gradient descent to predict the visual parameter values.

\* \* \* \* \*